US012544173B2

(12) United States Patent
Noohi Bezanjani et al.

(10) Patent No.: US 12,544,173 B2
(45) Date of Patent: Feb. 10, 2026

(54) TECHNIQUES FOR ADJUSTING A DISPLAY UNIT OF A VIEWING SYSTEM

(71) Applicant: INTUITIVE SURGICAL OPERATIONS, INC., Sunnyvale, CA (US)

(72) Inventors: Ehsan Noohi Bezanjani, Los Gatos, CA (US); Lawton N. Verner, Saratoga, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 252 days.

(21) Appl. No.: 18/254,413

(22) PCT Filed: Nov. 30, 2021

(86) PCT No.: PCT/US2021/061234
§ 371 (c)(1),
(2) Date: May 25, 2023

(87) PCT Pub. No.: WO2022/115795
PCT Pub. Date: Jun. 2, 2022

(65) Prior Publication Data
US 2024/0000534 A1 Jan. 4, 2024

Related U.S. Application Data

(60) Provisional application No. 63/174,754, filed on Apr. 14, 2021, provisional application No. 63/119,603, filed on Nov. 30, 2020.

(51) Int. Cl.
*A61B 34/00* (2016.01)
*A61B 34/30* (2016.01)
(Continued)

(52) U.S. Cl.
CPC .............. *A61B 34/77* (2016.02); *A61B 34/25* (2016.02); *A61B 34/30* (2016.02); *A61B 34/74* (2016.02); *A61B 90/50* (2016.02); *A61B 90/361* (2016.02)

(58) Field of Classification Search
CPC ......... A61B 34/77; A61B 34/25; A61B 34/30; A61B 34/74; A61B 90/50; A61B 90/361;
(Continued)

(56) References Cited

U.S. PATENT DOCUMENTS

| 5,876,325 A | 3/1999 | Mizuno et al. |
| 6,424,885 B1 | 7/2002 | Niemeyer et al. |

(Continued)

FOREIGN PATENT DOCUMENTS

| EP | 3184069 A1 | 6/2017 |
| EP | 3412240 A1 | 12/2018 |

(Continued)

OTHER PUBLICATIONS

International Preliminary Report on Patentability for Application No. PCT/US2021/061234, mailed Jun. 15, 2023, 7 pages.

(Continued)

*Primary Examiner* — Sohana Tanju Khayer
(74) *Attorney, Agent, or Firm* — Artegis Law Group, LLP

(57) ABSTRACT

Techniques for adjusting a display unit (206) of a viewing system include repositionable structure (204) configured to support a display unit, first and second hand-input sensors (240) configured to receive inputs from the operator; and a control unit. The display unit is configured to display images viewable by an operator. The control unit is configured to receive a first input from the first hand-input sensor, receive a second input from the second hand-input sensor, and, in response to satisfaction of a criteria set including, determine a commanded motion based on the first and second inputs (Continued)

and command an actuator to move the repositionable structure based on the commanded motion. The criteria set includes that a first magnitude of the first input and a second magnitude of the second input are greater than a threshold.

20 Claims, 14 Drawing Sheets

(51) Int. Cl.
*A61B 90/00* (2016.01)
*A61B 90/50* (2016.01)

(58) Field of Classification Search
CPC .............. A61B 2090/064; A61B 34/37; A61B 2090/371
See application file for complete search history.

(56) References Cited

U.S. PATENT DOCUMENTS

| | | |
|---|---|---|
| 8,508,173 B2 | 8/2013 | Goldberg et al. |
| 8,808,164 B2 | 8/2014 | Hoffman et al. |
| 9,179,832 B2 | 11/2015 | Diolaiti |
| 9,308,937 B2 | 4/2016 | Griffiths et al. |
| 10,064,692 B2 | 9/2018 | Nakanishi et al. |
| 10,512,515 B2 | 12/2019 | Bailey |
| 10,568,704 B2 | 2/2020 | Savall et al. |
| 10,653,486 B2 | 5/2020 | Ishihara et al. |
| 10,980,604 B2 | 4/2021 | Ishihara et al. |
| 11,452,384 B2 | 9/2022 | Hondori et al. |
| 2007/0138992 A1* | 6/2007 | Prisco .................... A61B 34/70 318/568.21 |
| 2014/0297130 A1* | 10/2014 | Griffiths ................ A61B 50/13 701/41 |
| 2014/0316654 A1* | 10/2014 | Griffiths .................. B62D 1/12 701/41 |
| 2015/0045812 A1* | 2/2015 | Seo ........................ A61B 34/30 606/130 |
| 2015/0209059 A1* | 7/2015 | Trees .................. A61B 18/1445 606/205 |
| 2016/0007835 A1* | 1/2016 | Ogawa ............... A61B 1/00133 600/103 |
| 2016/0183930 A1 | 6/2016 | Herzlinger et al. |
| 2016/0331614 A1* | 11/2016 | Furman .................. A61G 7/018 |
| 2018/0092706 A1* | 4/2018 | Anderson ............... G06F 3/013 |
| 2019/0125462 A1* | 5/2019 | Peine ..................... A61B 34/74 |
| 2019/0183491 A1* | 6/2019 | Shelton, IV ........... A61B 34/30 |
| 2019/0183504 A1* | 6/2019 | Shelton, IV ...... A61B 17/07207 |
| 2019/0314005 A1 | 10/2019 | Ishihara et al. |
| 2020/0100852 A1 | 4/2020 | Ishihara et al. |
| 2020/0222125 A1 | 7/2020 | Ishihara et al. |
| 2020/0261160 A1 | 8/2020 | Peine et al. |
| 2021/0038335 A1* | 2/2021 | Maret .................... A61B 34/74 |
| 2021/0113254 A1* | 4/2021 | Brockman .......... B05C 17/0133 |
| 2021/0282878 A1* | 9/2021 | Torabi .................... A61B 90/37 |
| 2022/0155900 A1 | 5/2022 | Sanz-Robinson et al. |
| 2022/0296323 A1 | 9/2022 | Waldo et al. |
| 2023/0064265 A1 | 3/2023 | Sweeney et al. |

FOREIGN PATENT DOCUMENTS

| | | |
|---|---|---|
| EP | 4017394 A1 | 6/2022 |
| EP | 4017395 A1 | 6/2022 |
| WO | WO-2021041249 A1 | 3/2021 |
| WO | WO-2021041253 A1 | 3/2021 |

OTHER PUBLICATIONS

International Search Report and Written Opinion for Application No. PCT/US2021/061234, mailed Mar. 3, 2022, 11 pages.

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

TECHNIQUES FOR ADJUSTING A DISPLAY UNIT OF A VIEWING SYSTEM

CROSS-REFERENCE TO RELATED APPLICATIONS

This application is a U.S. National Stage patent application of International Patent Application No. PCT/US2021/061234, filed Nov. 30, 2021, and claims the benefit of U.S. Provisional Patent Application No. 63/174,754, entitled "Techniques for Adjusting a Display Unit of a Viewing System" and filed Apr. 14, 2021, and additionally claims the benefit of U.S. Provisional Patent Application No. 63/119,603, entitled "Techniques for Adjusting a Display Unit of a Viewing System" and filed Nov. 30, 2020. The disclosures of each of which are incorporated by reference herein.

TECHNICAL FIELD

The present disclosure relates generally to electronic devices and more particularly to techniques for adjusting a display unit of a viewing system.

BACKGROUND

More and more devices are being replaced with computer-assisted electronic devices. This is especially true in industrial, entertainment, educational, and other settings. As a medical example, the hospitals of today have large arrays of electronic devices being found in operating rooms, interventional suites, intensive care wards, emergency rooms, and/or the like. Many of these electronic devices may be capable of autonomous or semi-autonomous motion. It is also common for personnel to control the motion and/or operation of electronic devices using one or more input devices located at a user control system. As a specific example, minimally invasive, robotic telesurgical systems permit surgeons to operate on patients from bedside or remote locations. Telesurgery refers generally to surgery performed using surgical systems where the surgeon uses some form of remote control, such as a servomechanism, to manipulate surgical instrument movements rather than directly holding and moving the instruments by hand.

When an electronic device is used to perform a task at a worksite, one or more imaging devices (e.g., an endoscope, an optical camera, and/or an ultrasound probe) can capture images of the worksite that provide visual feedback to an operator who is monitoring and/or performing the task. The imaging device(s) may be controllable to update a view of the worksite that is provided, via a display unit, to the operator. The display unit may be a monoscopic or stereoscopic display device having lenses or view screens. To use the display unit, the operator positions his or her eyes so as to see images displayed on the lenses or view screens of the display unit.

Because each operator may have a different size or prefer a different posture when using the display unit of a viewing system, an operator may want to make ergonomic adjustments to the position and orientation of the display unit from time to time. However, existing ergonomic adjustment techniques can disrupt workflow, be cumbersome or unintuitive to use, or be prone to accidental activation.

Accordingly, improved techniques for adjusting display units of viewing systems are desirable.

SUMMARY

Consistent with some embodiments, a computer-assisted device includes a repositionable structure configured to support a display unit, the repositionable structure comprising an actuator configured to move the repositionable structure, the display unit configured to display images viewable by an operator; first and second hand-input sensors configured to receive inputs from the operator; and a control unit communicatively coupled to the repositionable structure, the first hand-input sensor, and the second hand-input sensor, where the control unit is configured to: receive a first input from the first hand-input sensor, receive a second input from the second hand-input sensor, and in response to satisfaction of a criteria set, the criteria set including that a first magnitude of the first input and a second magnitude of the second input are greater than a first threshold: determine a commanded motion based on the first and second inputs, and command the actuator to move the repositionable structure based on the commanded motion.

Consistent with other embodiments, a method includes receiving a first input from a first hand-input sensor configured to receive inputs from an operator, receiving a second input from a second hand-input sensor configured to receive inputs from the operator, and in response to satisfaction of a criteria set, the criteria set including that a first magnitude of the first input and a second magnitude of the second input are greater than a first threshold: determining a commanded motion based on the first and second inputs, and commanding an actuator to move a repositionable structure based on the commanded motion, the repositionable structure configured to support a display unit, the display unit configured to display images viewable by the operator.

Other embodiments include, without limitation, one or more non-transitory machine-readable media including a plurality of machine-readable instructions which when executed by one or more processors are adapted to cause the one or more processors to perform any off the methods disclosed herein.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

DETAILED DESCRIPTION

Figure 1:
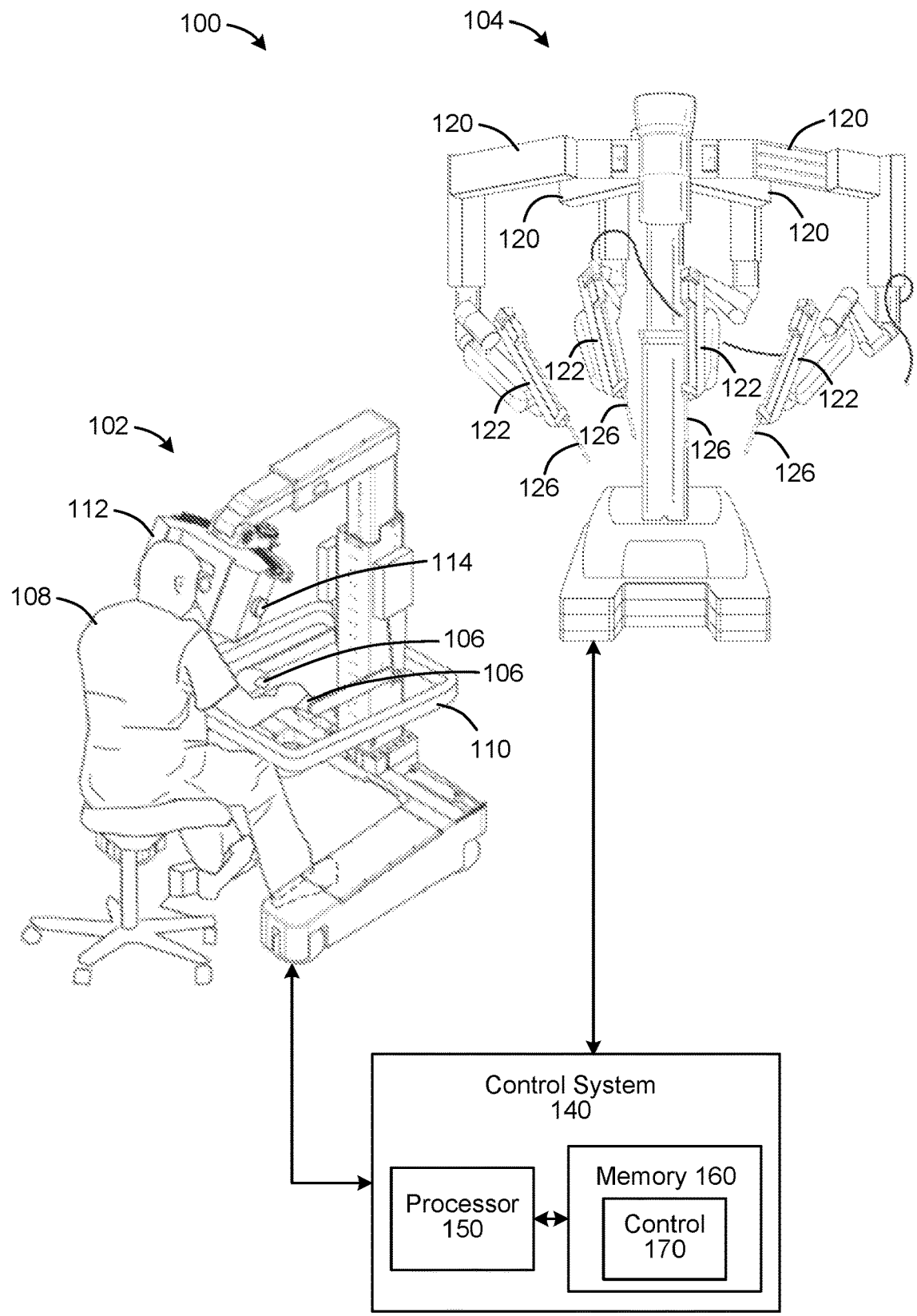
FIG. 1 is a simplified diagram of an example teleoperated system, according to various embodiments.

This description and the accompanying drawings that illustrate inventive aspects, embodiments, embodiments, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Further, this description's terminology is not intended to limit the invention. For example, spatially relative terms-such as "beneath", "below", "lower", "above", "upper", "proximal", "distal", and the like-may be used to describe one element's or feature's relationship to another element or feature as illustrated in the figures. These spatially relative terms are intended to encompass different positions (i.e., locations) and orientations (i.e., rotational placements) of the elements or their operation in addition to the position and orientation shown in the figures. For example, if the content of one of the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes include various special element positions and orientations. In addition, the singular forms "a", "an", and "the" are intended to include the plural forms as well, unless the context indicates otherwise. And the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements described in detail with reference to one embodiment, embodiment, or module may, whenever practical, be included in other embodiments, embodiments, or modules in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, embodiment, or application may be incorporated into other embodiments, embodiments, or aspects unless specifically described otherwise, unless the one or more elements would make an embodiment or embodiment non-functional, or unless two or more of the elements provide conflicting functions.

In some instances, well known methods, procedures, components, and circuits have not been described in detail so as not to unnecessarily obscure aspects of the embodiments.

This disclosure describes various devices, elements, and portions of computer-assisted devices and elements in terms of their state in three-dimensional space. As used herein, the term "position" refers to the location of an element or a portion of an element in a three-dimensional space (e.g., three degrees of translational freedom along Cartesian x-, y-, and z-coordinates). As used herein, the term "orientation" refers to the rotational placement of an element or a portion of an element (three degrees of rotational freedom—e.g., roll, pitch, and yaw). As used herein, the term "shape" refers to a set positions or orientations measured along an element. As used herein, and for a device with repositionable arms, the term "proximal" refers to a direction toward the base of the computer-assisted device along its kinematic chain and "distal" refers to a direction away from the base along the kinematic chain.

Aspects of this disclosure are described in reference to computer-assisted systems and devices, which may include systems and devices that are teleoperated, remote-controlled, autonomous, semiautonomous, robotic, and/or the like. Further, aspects of this disclosure are described in terms of an embodiment using a surgical system, such as the da Vinci® Surgical System commercialized by Intuitive Surgical, Inc. of Sunnyvale, California. Knowledgeable persons will understand, however, that inventive aspects disclosed herein may be embodied and implemented in various ways, including robotic and, if applicable, non-robotic embodiments and embodiments. embodiments on da Vinci® Surgical Systems are merely exemplary and are not to be considered as limiting the scope of the inventive aspects disclosed herein. For example, techniques described with reference to surgical instruments and surgical methods may be used in other contexts. Thus, the instruments, systems, and methods described herein may be used for humans, animals, portions of human or animal anatomy, industrial systems, general robotic, or teleoperational systems. As further examples, the instruments, systems, and methods described herein may be used for non-medical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (without return to a human or animal anatomy) and for procedures on human or animal cadavers. Further, these techniques can also be used for medical treatment or diagnosis procedures that include, or do not include, surgical aspects.

System Overview

FIG. 1 is a simplified diagram of an example teleoperated system 100, according to various embodiments. In some examples, the teleoperated system 100 may be a teleoperated medical system such as a surgical system. As shown, the teleoperated system 100 includes a follower device 104. The follower device 104 is controlled by one or more leader input devices, described in greater detail below. Systems that include a leader device and a follower device are also sometimes referred to as master-slave systems. Also shown in FIG. 1 is an input system that includes a workstation (e.g., a console) 102, and in various embodiments the input system may be in any appropriate form and may or may not include a workstation.

In this example, the workstation 102 includes one or more leader input devices 106 which are contacted and manipulated by an operator 108. For example, the workstation 102 may comprise one or more leader input devices 106 for use by the hands of the operator 108. The leader input devices 106 in this example are supported by the workstation 102 and may be mechanically grounded. An ergonomic support 110 (e.g., forearm rest) may be provided in some embodiments, on which the operator 108 may rest his or her forearms. In some examples, the operator 108 may perform tasks at a worksite near the follower device 104 during a procedure by commanding the follower device 104 using the leader input devices 106.

A display unit 112 is also included in the workstation 102. The display unit 112 may display images for viewing by the operator 108. The display unit 112 may be moved in various degrees of freedom to accommodate the viewing position of the operator 108 and/or to optionally provide control functions as another leader input device. In the example of the teleoperated system 100, displayed images may depict a worksite at which the operator 108 is performing various tasks by manipulating the leader input devices 106 and/or the display unit 112. In some examples, the images displayed by the display unit 112 may be received by the workstation 102 from one or more imaging devices for capturing images arranged at the worksite. In other examples, the images displayed by the display unit may be generated by the display unit 112 (or by a connected other device or system), such as for virtual representations of tools, the worksite, or for user interface components.

When using the workstation 102, the operator 108 may sit in a chair or other support in front of the workstation 102, position his or her eyes in front of the display unit 112, manipulate the leader input devices 106, and rest his or her forearms on the ergonomic support 110 as desired. In some embodiments, the operator 108 may stand at the workstation or assume other poses, and the display unit 112 and leader input devices 106 may be adjusted in position (height, depth, etc.) to accommodate the operator 108.

The teleoperated system 100 may also include the follower device 104, which may be commanded by the workstation 102. In a medical example, the follower device 104 can be located near an operating table (e.g., a table, bed, or other support) on which a patient may be positioned. In such cases, the worksite may be provided on the operating table, e.g., on or in a patient, simulated patient or model, etc. (not shown). The teleoperated follower device 104 shown includes a plurality of manipulator arms 120, each configured to couple to an instrument assembly 122. An instrument assembly 122 may include, for example, an instrument 126 and an instrument carriage configured to hold a respective instrument 126.

In various embodiments, one or more of the instruments 126 may include an imaging device for capturing images (e.g., optical cameras, hyperspectral cameras, ultrasonic sensors, etc.). For example, one or more of the instruments 126 could be an endoscope assembly that includes an imaging device, which may provide captured images of a portion of the worksite to be displayed via the display unit 112.

In some embodiments, the follower manipulator arms 120 and/or instrument assemblies 122 may be controlled to move and articulate the instruments 126 in response to manipulation of leader input devices 106 by the operator 108, so that the operator 108 may perform tasks at the worksite. The manipulator arms 120 and instrument assemblies 122 are examples of repositionable structures on which instruments and/or imaging devices can be mounted. For a surgical example, the operator may direct the follower manipulator arms 120 to move instruments 126 to perform surgical procedures at internal surgical sites through minimally invasive apertures or natural orifices.

As shown, a control system 140 is provided external to the workstation 102 and communicates with the workstation 102. In other embodiments, the control system 140 may be provided in the workstation 102 or in the follower device 104. As the operator 108 moves leader input device(s) 106, sensed spatial information including sensed position and/or orientation information is provided to the control system 140 based on the movement of the leader input devices 106. The control system 140 may determine or provide control signals to the follower device 104 to control the movement of the manipulator arms 120, instrument assemblies 122, and/or instruments 126 based on the received information and operator input. In one embodiment, the control system 140 supports one or more wired communication protocols, (e.g., Ethernet, USB, and/or the like) and/or one or more wireless communication protocols (e.g., Bluetooth, IrDA, HomeRF, IEEE 1002.11, DECT, Wireless Telemetry, and/or the like).

The control system 140 may be implemented on one or more computing systems. One or more computing systems may be used to control the follower device 104. In addition, one or more computing systems may be used to control components of the workstation 102, such as movement of a display unit 112.

As shown, the control system 140 includes a processor 150 and a memory 160 storing a control module 170. In embodiments, the control system 140 may include one or more processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. In addition, functionality of the control module 170 can be implemented in any technically feasible software and/or hardware.

Each of the one or more processors of the control system 140 may be an integrated circuit for processing instructions. For example, the one or more processors may be one or more cores or micro-cores of a processor, a central processing unit (CPU), a microprocessor, a field-programmable gate array (FPGA), an application-specific integrated circuit (ASIC), a digital signal processor (DSP), a graphics processing unit (GPU), a tensor processing unit (TPU), and/or the like. The control system 140 may also include one or more input devices, such as a touchscreen, keyboard, mouse, microphone, touchpad, electronic pen, or any other type of input device.

A communication interface of the control system 140 may include an integrated circuit for connecting the computing system to a network (not shown) (e.g., a local area network (LAN), a wide area network (WAN) such as the Internet, mobile network, or any other type of network) and/or to another device, such as another computing system.

Further, the control system 140 may include one or more output devices, such as a display device (e.g., a liquid crystal display (LCD), a plasma display, touchscreen, organic LED display (OLED), projector, or other display device), a printer, a speaker, external storage, or any other output device. One or more of the output devices may be the same or different from the input device(s). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform some embodiments of the invention.

Continuing with FIG. 1, the control system 140 may be connected to or be a part of a network. The network may include multiple nodes. The control system 140 may be implemented on one node or on a group of nodes. By way of example, the control system 140 may be implemented on a node of a distributed system that is connected to other nodes. By way of another example, the control system 140 may be implemented on a distributed computing system having multiple nodes, where different functions and/or components of the control system 140 may be located on a different node within the distributed computing system. Further, one or more elements of the aforementioned control system 140 may be located at a remote location and connected to the other elements over a network.

In some embodiments, one or more leader input devices may be ungrounded (ungrounded leader input devices being not kinematically grounded, such as leader input devices held by the hands of the operator 108 without additional physical support). Such ungrounded leader input devices may be used in conjunction with the display unit 112. In some embodiments, the operator 108 may use a display unit 112 positioned near the worksite, such that the operator 108 may manually operate instruments at the worksite, such as a laparoscopic instrument in a surgical example, while viewing images displayed by the display unit 112.

Some embodiments may include one or more components of a teleoperated medical system such as a da Vinci® Surgical System, commercialized by Intuitive Surgical, Inc. of Sunnyvale, California, U.S.A. Embodiments on da Vinci® Surgical Systems are merely examples and are not to be considered as limiting the scope of the features disclosed herein. For example, different types of teleoperated systems having follower devices at worksites, as well as non-teleoperated systems, may make use of features described herein.

Figure 2:
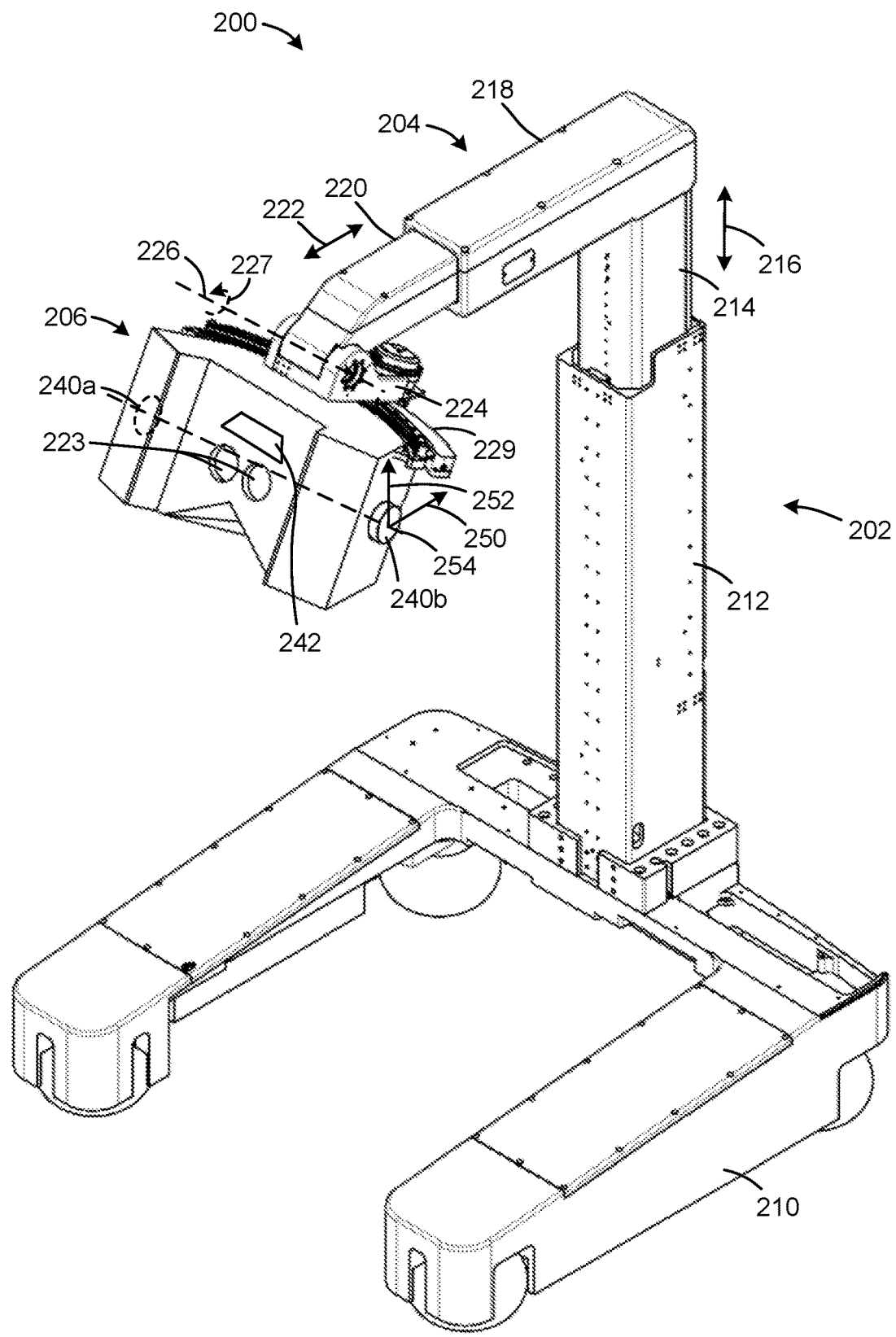
FIG. 2 is a perspective view of an example display system, according to various embodiments.
Figure 3:
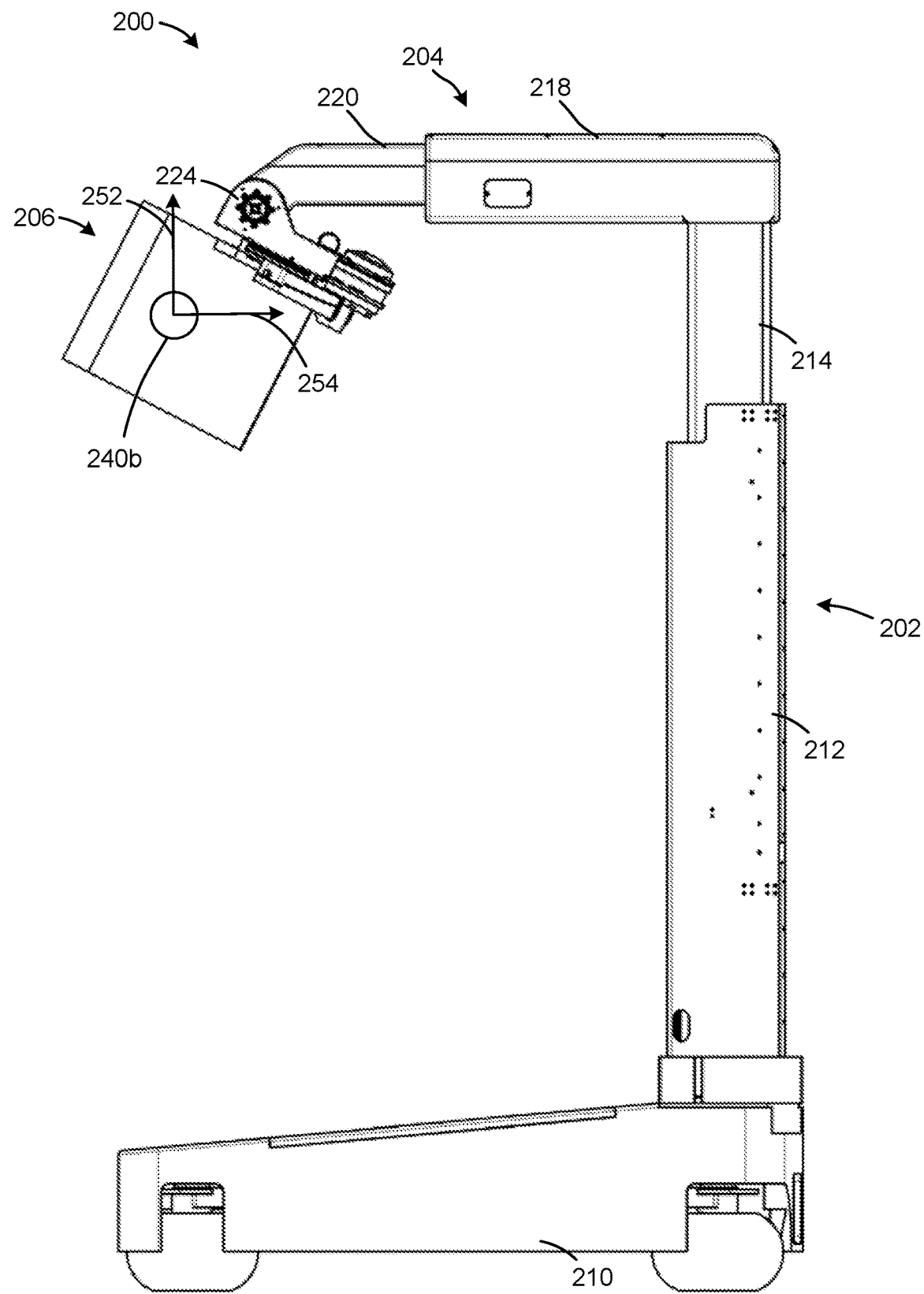
FIG. 3 is a side view of an example display system, according to various embodiments.

FIG. 2 is a perspective view of an example display system 200, according to various embodiments. FIG. 3 is a side view of the example display system 200, according to various embodiments. In some embodiments, the display system 200 is used in a workstation of a teleoperated system (e.g., in workstation 102 of the teleoperated system 100 of FIG. 1), or the display system 200 may be used in other systems or as a standalone system, e.g., to allow an operator to view a worksite or other physical site, a displayed virtual environment, etc. Although FIGS. 2-3 show a specific configuration, other embodiments may use different configurations.

As shown in FIGS. 2-3, the display system 200 includes a base support 202, an arm support 204, and a display unit 206. The display unit 206 is provided with multiple degrees of freedom of movement provided by a support linkage including base support 202, arm support 204 coupled to the base support 202, and a tilt member 224 (described below) coupled to the arm support 204, where the display unit 206 is coupled to the tilt member 224.

The base support 202 may be a vertical member that is mechanically grounded, e.g., directly or indirectly coupled to ground, such as by resting or being attached to a floor. For example, the base support 202 may be mechanically coupled to a wheeled support structure 210 that is coupled to the ground. The base support 202 includes a first base portion 212 and a second base portion 214 coupled such that the second base portion 214 is translatable with respect to the first base portion 212 in a linear degree of freedom.

The arm support 204 may be a horizontal member that is mechanically coupled to the base support 202. The arm support 204 includes a first arm portion 218 and a second arm portion 220. The second arm portion 220 is coupled to the first arm portion 218 such that the second arm portion 220 is linearly translatable in a first linear degree of freedom (DOF) with respect to the first arm portion 218.

The display unit 206 may be mechanically coupled to the arm support 204. The display unit 206 may be moveable in a second linear DOF provided by the linear translation of the second base portion 214 and second arm portion 220.

In some embodiments, the display unit 206 includes a display device, e.g., one or more display screens, projectors, or other display devices, that may display digital images. The display unit 206 may include two viewports 223, where the display device is provided behind or included in the viewports. One or more display screens or other display devices may be positioned on the display unit 206 in place of the viewports 223 in some embodiments.

In some embodiments, the display unit 206 displays images of a worksite (e.g., an interior anatomy of a patient in a medical example), captured by an imaging device such as an endoscope. The worksite may alternatively be a virtual representation of a worksite. The images may show captured images or virtual renderings of instruments 126 of the follower device 104 while one or more of these instruments 126 are controlled by the operator via the leader input devices (e.g., the leader input devices 106 and/or the display unit 206) of the workstation 102.

In some embodiments, the display unit 206 is rotationally coupled to the arm support 204 by a tilt member 224. In the illustrated example, the tilt member 224 is coupled at a first end to the second arm portion 220 of the arm support 204 by a rotary coupling configured to provide rotational motion of the tilt member 224 and the display unit 206 about the tilt axis 226 with respect to the second arm portion 220. In some embodiments, the tilt axis 226 is a tilt axis 226d above the display device in the display unit 206.

Each of the various degrees of freedom discussed herein may be passive and require manual manipulation for movement, or be movable by one or more actuators, such as by one or more motors, solenoids, etc. For example, the rotational motion of the tilt member 224 and the display unit 206 about the tilt axis 226 may be driven by one or more actuators, such as by a motor coupled to the tilt member at or near the tilt axis 226.

The display unit 206 may be rotationally coupled to the tilt member 224 and may rotate about a yaw axis 230. For example, the rotation may be a lateral or left-right rotation from the point of view of an operator viewing images of the display unit 206 via the viewports 223. In this example, the display unit 206 is coupled to the tilt member by a rotary mechanism which may be a track mechanism. For example, in some embodiments, the track mechanism includes a curved track 228 that slidably engages a groove member 229 coupled to the tilt member 224, allowing the display unit 206 to rotate about the yaw axis 230 by moving the curved track 228 through a groove of the groove member 229.

The display system 200 may thus provide the display unit 206 with a vertical linear degree of freedom 216, a horizontal linear degree of freedom 222, and rotational (tilt) degree of freedom 227. A combination of coordinated movement of components of the display system 200 in these degrees of freedom allow the display unit 206 to be positioned at various positions and orientations based on the preferences of an operator. The motion of the display unit 206 in the tilt, horizontal, and vertical degrees of freedom allow the display unit 206 to stay close to, or maintain contact with, the head of the operator, such as when the operator is providing head input through head motion when the display system 200 is in a steerable viewer mode. In the steerable viewer mode, the operator may move his or her head to provide input to control the display unit 206 to follow the motion of the head, and motions of the head can further control the position and/or orientation of one or more imaging devices that capture images displayed via the display unit 206. Although some embodiments are described herein as including a steerable viewer mode, other embodiments may not include a steerable viewer mode. In embodiments with and without steerable viewer modes, the position and/or orientation of one or more imaging devices that capture images displayed via the display unit 206 may be controlled using devices other than display unit 206, such as via the leader input devices 106 that are manipulated by the hands of an operator.

The degrees of freedom of the display system allow the display system 200 to provide pivoting motion of the display unit 206 in physical space about a pivot axis that may be positioned in different locations. For example, the display system 200 may provide motion of the display unit 206 in physical space that corresponds to motion of a head of an operator when operating the display system 200. Such a motion may include rotation about a defined neck pivot axis that approximately corresponds to a neck axis of the head of the operator at the neck of the operator. The rotation allows the display unit 206 to be moved in accordance with the head of the operator that is directing movement of the display unit 206. In another example, the motion may include rotation about a defined forehead pivot axis that approximately corresponds to a forehead axis extending through the head of the operator at the forehead when the display unit 206 is oriented, as shown, in a centered yaw rotary position about the yaw axis 230.

The display unit 206 may include one or more input devices that allow an operator to provide input to manipulate the orientation and/or position of the display unit 206 in space, and/or to manipulate other functions or components of the display system 200 and/or a larger system, (e.g., a teleoperated system).

Illustratively, the display unit 206 includes a head-input sensor 242. In some embodiments, the head-input sensor 242 is positioned on a surface of the display unit 206 that is facing the head of the operator during operation of the display unit 206.

The head-input sensor 242 may comprise or be coupled to a headrest configured to be in contact with the head of the operator when the operator is providing head input. More specifically, the head-input sensor 242 may sense inputs applied to the headrest or the display unit 206 in a region above the viewports 223. In some embodiments, the head-input sensor is located in that region, and that region is configured to be in contact with the forehead of the operator while the operator is viewing images through the viewports 223. The display unit 206 may include one or more head input sensors, such as the to the head-input sensor 242, that sense operator head input as commands to cause movement of the imaging device, or otherwise cause updating of the view in the images presented to the operator (such as by graphical rendering, digital zooming or panning, etc.). Further, in some embodiments and some instances of operation, the sensed head movement is used to move the display unit 206 to compensate for the head movement. The position of the head of the operator may, thus, remain stationary relative to the viewports 223, even when the operator performs head movements to control the view provided by the imaging device. A proper alignment of the eyes of the operator with the viewports may thus be maintained.

In some embodiments, sensing the operator head input includes sensing a presence or contact by a part or the entire head of an operator (e.g., the forehead) with the head-input sensor 242. More generally, head input can be sensed in any technically feasible manner by head-input sensor(s) in embodiments, and the head of the operator may or may not contact the head input sensor(s). For example, a head-input sensor may be under the surface of the display unit 206 in some embodiments. In such cases, the head of the operator may not contact the head input sensor, and force may instead be transmitted through/to the head input sensor. The head-input sensor 242 may include any of a variety of types of sensors, e.g., resistance sensors, capacitive sensors, force sensors, optical sensors, etc.

Continuing with FIG. 2, in the steerable viewer mode, the orientation and/or position of the display unit 206 may be changed by the display system 200 based on the operator head input to the head-input sensor 242. For example, sensed operator input is provided to a control system (e.g., the control system 140), which controls actuators of the display system 200 to move the second base portion 214 in linear degree of freedom 216, the second arm portion 220 in linear degree of freedom 222, tilt member 224 in rotary degree of freedom 227, and/or display unit 206 in rotary degree of freedom 231, to cause the display unit 206 to be moved as commanded by (e.g., in accordance with) the sensed operator head input. Sensed operator head input may also be used to control other functions of the display system 200 and/or of a larger system (e.g., teleoperated system 100 of FIG. 1). As described, in some embodiments, sensed operator head input may be used to control one or more imaging devices for capturing images of a worksite that are displayed via the display unit 206. Thus, in some embodiments, in the steerable viewer mode, the operator may move his or her head to provide input to control the display unit 206 to be moved by the display system 200 in accordance with the motion of the head. Doing so allows the display unit 206 to follow motions of the head of the operator and changes in viewing angle.

Independent of whether a steerable viewer mode is supported, some embodiments provide an ergonomic adjustment mode, described in greater detail below, in which an operator can make ergonomic adjustments to the position and/or orientation of a display unit (e.g., the display unit 206). Thus, systems with ergonomic adjustment modes may support or may not support steerable viewer modes. In the ergonomic adjustment mode for some embodiments, inputs by both hands of the operator are sensed and used to determine commands for actuating the repositionable structure to which the display unit 206 is mounted. The inputs by the hands of the operator can be further used with inputs by a head of the operator to determine commands for actuating the repositionable structure to which the display unit 206 is mounted. In some embodiments, the head inputs can be sensed by the head-input sensor 242, described above. Further, the hand inputs can be sensed by any technically feasible hand-input sensors that are capable of sensing forces, torques, linear displacements, or angular displacements, velocities, or accelerations or other physical parameters. In some embodiments, some physical parameters may be used as a proxy for other physical parameters. For example, simple, moving systems may be modeled by frictionless Newtonian mechanics, and acceleration may be sensed as a proxy for force, related by mass. As another example, some systems may be modeled with Hooke's law springs, and linear or angular displacement may be sensed as a proxy for force or torque, related by a spring constant.

Illustratively, hand-input sensors 240a-b are disposed on two sides of the display unit 206. Although shown as knobs, the hand-input sensors may be of any appropriate shape and/or type, including convex or concave polyhedrons, joysticks, touch-sensitive panels, inset or otherwise recessed, etc. In some examples, the hand-input sensors 240a-b may include strain guages, inductive sensors, linear position sensors, capacitive sensors, resistive sensors, accelerometers, etc. Although described herein primarily with respect to hand-input sensors that sense input applied by both hands of an operator, in other embodiments, the hand-input sensors may be configured to sense inputs applied by the same hand of an operator.

In some embodiments, the display unit 206 is restricted in degrees of freedom by a repositionable arm coupled to the display unit 206. In some embodiments, the repositionable arm is configured to allow the display unit 206 to move in the plane corresponding to the vertical and horizontal linear degrees of freedom 216 and 222, and to rotate about the tilt axis 226. As shown, hand inputs or linear displacements, linear velocities, or linear accelerations, can also be sensed in the y-z plane, the y-z plane being defined by y-axis 252 and z-axis 250. In addition, torques or angular displacements, angular velocities, or angular accelerations can be sensed about a pitch axis 254 that passes through the hand-input sensors 240a-b that the operator can turn. In some embodiments, the hand-input sensors 240a-b are disposed to the left and right of where the eyes of the operator would be during use, so that the pitch axis 254 between the hand-input sensors 240a-b is approximately aligned with the eyes of the operator during use. For example, the hand-input sensors 240a-b could be disposed to the left and right of the viewports 223 or a display of the display unit 206. Similarly, the head-input sensor 242 can be disposed proximate to where the eyes of the operator would be during use, and in a way so that the pitch axis 254 is approximately aligned with the eyes of the operator during use. In some embodiments, rotations of the display unit 206 about a pitch axis that is approximately aligned with the eyes of the operator are not accompanied by significant linear motions of the display unit 206, which can be more comfortable for the operator.

It is understood that FIG. 2 merely shows an example for a configuration of a display system. Alternative configurations supporting movement of the display unit 206 based on an input from the operator are also possible. Any linkage that supports the display unit 206 and provides it with degrees of freedom and ranges of motion appropriate for the application may be used in lieu of the configuration shown in FIG. 2. Additional examples of moveable display systems are described in U.S. Provisional Patent Application No. 62/890,844, filed Aug. 23, 2019, and entitled "Moveable Display System," and International Patent Application Publication No. WO 2021/041249, filed Aug. 21, 2020, and entitled "Moveable Display System," both of which are incorporated by reference herein.

Although described herein primarily with respect to the display unit 206 that is part of a grounded mechanical structure (e.g., the display system 200), in other embodiments, the display unit may be any technically feasible display device or devices. For example, the display unit could be a handheld device, such as a tablet device or mobile phone. As another example, the display unit could be a head-mounted device (e.g., glasses, goggles, helmets). In all of these cases, the position and/or orientation of the display unit may be determined using one or more accelerometers, gyroscopes, inertial measurement units, cameras, and/or other sensors internal or external to the display unit.

Display Unit Adjustment in a Viewing System

Independent of whether a display unit (e.g., the display unit 206) supports a steerable viewer mode, the display unit may be adjusted based on preferences of the operator. From time to time, the operator may want to make ergonomic adjustments to the position and/or orientation of the display unit.

An ergonomic adjustment mode can be entered in any technically feasible manner. In some embodiments, the ergonomic adjustment mode is entered in response to hand input sensed by hand-input sensors (e.g., the hand-input sensors 240a-b) meeting particular criteria; for example, when forces and/or torques meeting particular criteria are detected. In some embodiments, an operator could make ergonomic adjustments to the position and/or orientation of the display unit 206 in the ergonomic adjustment mode, and then switch to the steerable viewer mode. From time to time, the operator may re-enter the ergonomic adjustment mode to make further ergonomic adjustments to the position and/or orientation of the display unit 206.

Figure 4:
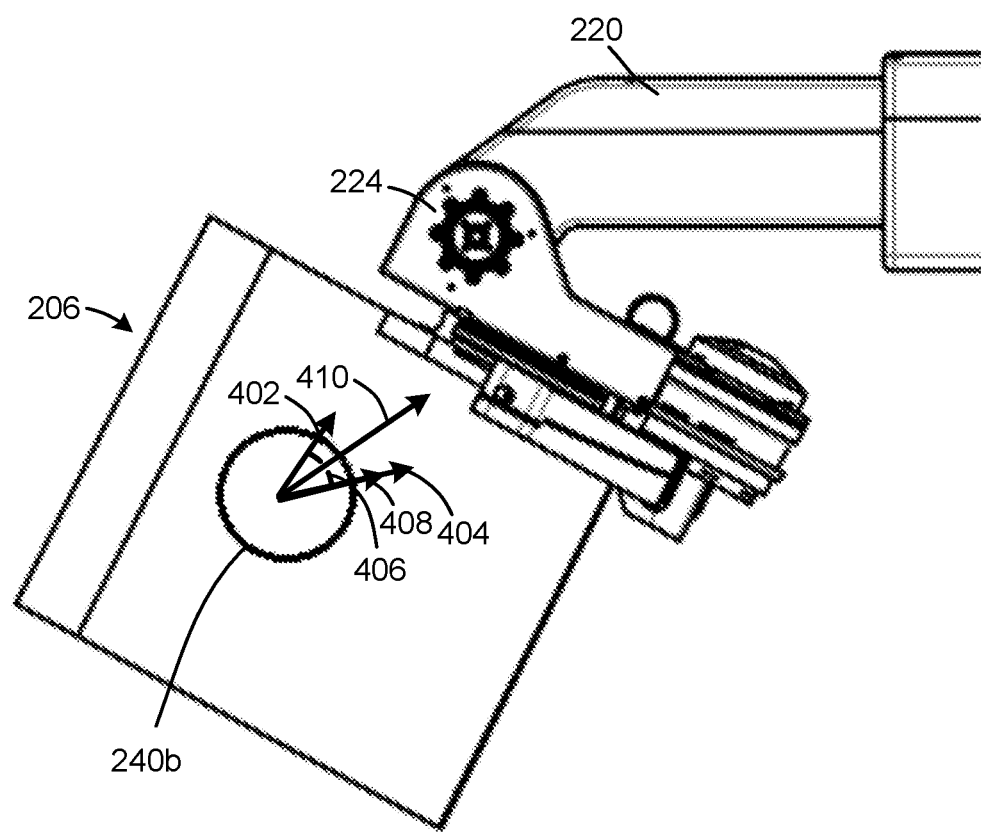
FIG. 4 illustrates an approach for combining linear hand inputs sensed by hand-input sensors during an adjustment of a display unit, according to various embodiments.

FIG. 4 illustrates an approach for combining linear hand inputs sensed by hand-input sensors 240a-b during an adjustment of the display unit 206, according to various embodiments. As shown, two example linear hand inputs 402 and 404 have been sensed by hand-input sensors 240a-b after an ergonomic adjustment mode is entered. In this example, the linear hand inputs 402 and 404 are shown as linear inputs with magnitudes and directions and are represented by vectors.

In some examples, the linear hand inputs 402 and 404 could be inputs applied by the hands of an operator, such as by one or more fingers, the palms, the wrists, and/or another part of the hand. The linear hand inputs 402 and 404 can be sensed by the hand-input sensors 240a-b described above in conjunction with FIGS. 2-3. In various embodiments, the linear hand inputs 402 and 404 can comprise linear forces, linear displacements, linear positions, linear velocities, and/or linear accelerations. The hand-input sensors 240a-b may detect these parameters directly or detect one or more proxies from which the parameters can be derived (e.g., detect velocity over time, and integrate to provide displacement or position). In some embodiments, the linear hand inputs 402 and 404 may be derived using techniques to aggregate, filter, or average sensor signals over space (e.g., from multiple sensing elements) or time.

Illustratively, in FIG. 4, the linear hand inputs 402 and 404 are in a plane (in this case, labeled as the y-z plane). As described, the display unit 206 is restricted by the repositionable structure to move in such an y-z plane in some embodiments. In other embodiments, the display unit 206 may be permitted to move in any number of degrees of freedom, up to and including six DOFs. In addition, linear hand inputs can be sensed in fewer or more DOFs than the display unit 206 is permitted to move. In such cases, one or more components of the sensed linear hand inputs may be unused in determining commands to move the display unit 206 or the repositionable structure. For example, these one or more components may be ignored or discarded when determining the commands. For example, in an embodiment where linear hand inputs are sensed with a component in the x direction and the display unit 206 is restricted to moving in the y-z plane, the x component of sensed linear hand inputs are not used in determining motion comments for the display unit or the repositionable structure.

To help increase the likelihood that the motion of the display unit 206 produced in response to activations of the hand-input sensors are intended by the operator, a control module (e.g., the control module 170) performs checks to determine whether a criteria set is met and commands the motion of the display unit 206 in response to the criteria set being met. The criteria set may include a single criterion, or a plurality of criteria. Various embodiments may use criteria sets comprising one, two, or multiple ones of these example criteria.

In some embodiments, a criterion in the criteria set includes that each of the linear hand inputs 402 and 404 has a magnitude that is less than a threshold magnitude. In such cases, the display unit 206 is not commanded to move when either of the linear hand inputs 402 or 404 has a magnitude that is less than the threshold magnitude. As a result, activations (e.g., accidental activations) of the hand-input sensors that involve hand inputs having magnitudes less than the threshold magnitude will not cause motion of the display unit 206. In some embodiments, a criterion includes that a combination of the linear hand inputs 402 and 404, such as the non-linear summation described below, has a magnitude that is less than a threshold magnitude. In such cases, the display unit 206 is not commanded to move when the combination of the linear hand inputs 402 and 404 has a magnitude that is less than the threshold magnitude.

In some embodiments, a criterion includes that the directions of the linear hand inputs 402 and 404, or of components of the linear hand inputs 402 and 404 in particular planes, differ by less than a threshold angle. The threshold angle can be a constant predefined angle or a user-definable angle. For example, the threshold angle could be approximately 15 to 30 degrees. In some embodiments, when the display unit 206 is restricted to move in the y-z plane, the directions of the components of the linear hand inputs 402 and 404 in the y-z plane are required to be less than the threshold angle. As a result, activations of one of the hand-input sensors 240a-b that do not correspond (within the required angular differences) with contemporaneous activations of the other hand-input sensor 240a-b, will not cause motion of the display unit 206.

In some embodiments, a criterion of the criteria set is that the magnitudes of the linear hand inputs 402 and 404 differ by less than a maximum ratio. For example, the maximum ratio may be approximately five in some embodiments. In some embodiments, a criterion of the criteria set includes that the magnitudes of the linear hand inputs 402 and 404 are less than or equal to a maximum magnitude associated with a maximum velocity that the display unit 206 can move. In some examples, the control unit accepts but scales down linear hand inputs whose magnitudes are greater than the maximum magnitude, such as to the maximum magnitude.

These example criteria may be adjusted based on the DOF(s) supported by the embodiments. For example, in some embodiments, the repositionable structure on which the display unit is mounted may only provide the display unit with one DOF (e.g., in and out relative to lenses/view screens of the display unit 206). In such cases, the threshold angle criterion may be adjusted to require that the directions of the linear hand inputs (or the directions of the components of the linear hand inputs along that one DOF) are the same, and not opposite to each other in the one DOF.

In response to the criteria set being met, the control module determines a composite linear input 410 using the linear hand inputs 402 and 404. In some embodiments, the control module combines the linear hand inputs 402 and 404 using a non-linear summation to determine the composite linear input 410. As shown in this example, a magnitude of the linear hand input 404 is larger than a magnitude of the linear hand input 402. An example non-linear summation performs the following: (1) reduces the magnitude of the linear hand input (e.g., a magnitude of a hand force) 404 having the larger magnitude to the magnitude of the linear hand input 402 (e.g., a magnitude of a hand force) having the smaller magnitude, while maintaining the same direction as the linear hand input 404, thereby generating a virtual linear hand input (e.g., a virtual hand force) 408, and (2) adds the virtual linear hand input 408 to the linear hand input 402 having the smaller magnitude to obtain the composite linear input 410. In this example of non-linear summation, the composite linear input 410 is in a direction that bisects the direction of the linear hand input 402 and the direction of the linear hand input 404.

In some other embodiments, the control module determines a composite linear input 410 using other linear or non-linear techniques. Another example technique involves performing the following: (1) adding the linear hand inputs (e.g., hand forces) 402 and 404 to obtain an intermediate linear hand input (e.g., an intermediate force), and (2) scaling a magnitude of the intermediate linear hand input force according to a function of an angle between the directions of the linear hand inputs 402 and 404 to obtaining the composite linear input 410. Any technically feasible function of the angle between the directions of the linear hand inputs 402 and 404 can be used. For example, the function could be a Gaussian function. As another example, the function could be a constant within a range of angular values and taper off in shoulder regions outside the range of angular values.

The control module can compute a commanded motion for moving the display unit 206 based on the composite linear input 410. For example, the control module may determine a commanded position, commanded velocity, commanded acceleration, or other motion-related parameter based on the composite linear input 410 and use such a motion-related parameter to compute the commanded motion. As a specific example, the commanded motion may include a linear velocity proportional to the composite linear input 410.

Figure 5:
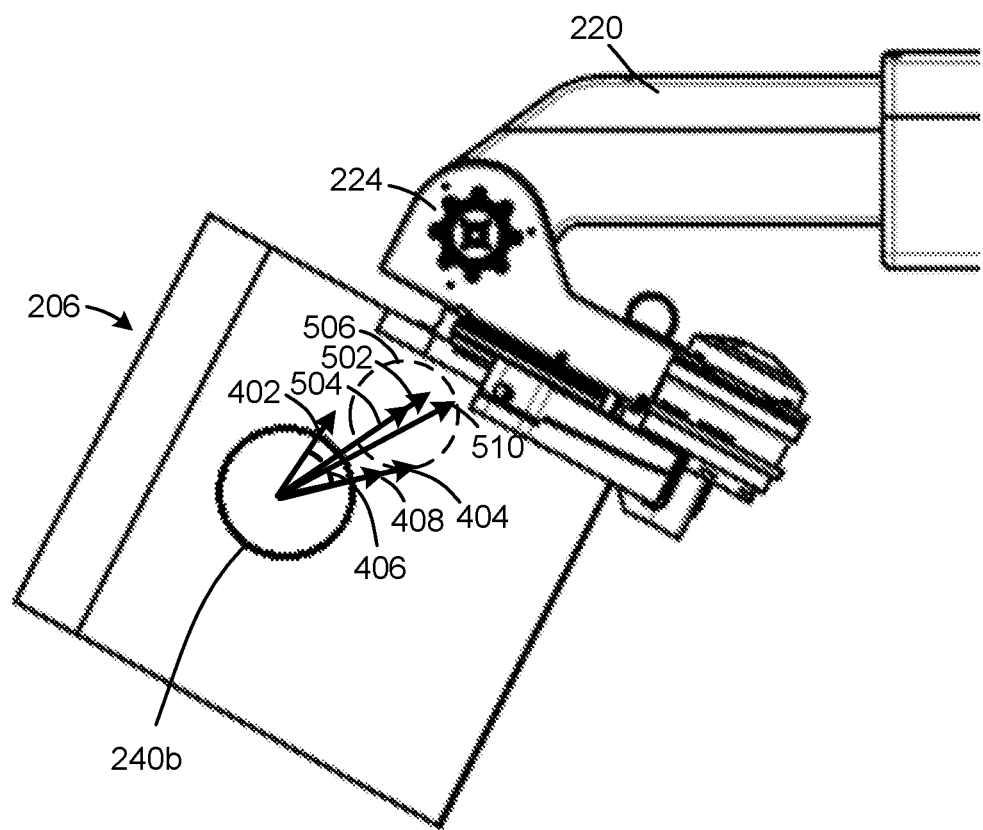
FIG. 5 illustrates an approach for combining linear hand inputs sensed by hand-input sensors during an adjustment of a display unit, according to various other embodiments.

FIG. 5 illustrates another approach for combining linear hand inputs sensed by hand-input sensors 240*a*-*b* during an adjustment of the display unit 206, according to various embodiments. As shown, the example linear hand inputs 402 and 404, described above in conjunction with FIG. 4, are sensed by the hand-input sensors 240*a*-*b* after an ergonomic adjustment mode is entered. A control module (e.g., the control module 170) then checks to determine whether a criteria set is met, and commands motion of the display unit 206 in response to the criteria set being met.

In some embodiments, the criteria set includes the criterion that each of the linear hand inputs 402 and 404 has a magnitude that is more than (not less than) a threshold magnitude for the repositionable structure to be commanded to move; in this example, the repositionable structure is not commanded to move display unit 206 when at least one of the linear hand inputs 402 or 404 has a magnitude less than the threshold magnitude. Other criteria in the criteria set may include any of the criteria described above in conjunction with FIG. 4 except that the criterion set does not include the following criterion—that directions of the linear hand inputs 402 and 404, or directions of components of the linear hand inputs 402 and 404 in particular planes, differ by less than a threshold angle.

In some embodiments, when both of the linear hand inputs 402 and 404 have magnitudes greater than the threshold magnitude, the control module determines a combination 502 of the linear hand inputs 402 and 404. In some embodiments, the combination 502 is computed using the same non-linear summation that is used to compute the composite linear input 410, described in conjunction with FIG. 4. The control module then scales a magnitude of the combination 502 to generate a gating center 504. The gating center 504 thus has a same direction and a scaled magnitude compared to the combination 502. In some embodiments, the control module scales the magnitude of the combination 502 according to a function of an angle between the directions of the linear hand inputs measured by the hand-input sensors 240*a*-*b*. For example, the function could be a Gaussian function or a function that is constant (e.g., 1) within a range of angular values (e.g., 0-30 degrees) and tapers off to zero in shoulder regions outside the range of angular values (e.g., decreases to zero from 30 to 60 degrees). In these examples, linear hand inputs having directions that differ more from each other result in gating centers 504 with smaller scale factors and smaller magnitudes.

After obtaining the gating center 504, the control module checks whether a composite of the linear hand inputs 402 and 404, shown as the composite linear input 510, lies within a region of acceptance 506 around the gating center 504. In some embodiments, this composite of the linear hand inputs 402 and 404 is a sum of the linear hand inputs 402 and 404 (e.g., a sum of vectors representing those inputs). Any technically feasible sum may be used, such as a straight sum, a weighted sum, etc., in some embodiments. In some embodiments, the region of acceptance 506 is three-dimensional, such as comprising a sphere centered on the tip of a vector representing the gating center 504 and extending out a given radius. In other embodiments, the region of acceptance is two-dimensional (e.g., a circle centered about gating center 504) or one-dimensional (i.e., a linear range centered about gating center 504). The number of dimensions of the region of acceptance 506 may be based on the number or types of DOFs available to the display unit 206. In some embodiments, the radius of the region of acceptance 506 is determined according to a function of a ratio between magnitudes of the linear hand inputs. For example, the ratio could have the magnitude of a linear hand input with a smaller magnitude in the numerator and the magnitude of a linear hand input with a larger magnitude in the denominator (i.e., the ratio is less than one), and the function could output a constant radius within a range of ratios between magnitudes of the linear hand inputs, with a shoulder region that tapers off to a minimum radius near zero. In such cases, when the magnitudes of the linear hand inputs are similar, the region of acceptance may have a constant radius about the gating center. Alternatively, when the magnitudes of the linear hand inputs differ by a large amount, the region of acceptance may be set to have a radius close or equal to the minimum radius. It should be understood that if the radius is set to zero rather than a minimum radius, then the approach for combining linear hand inputs of FIG. 5 would be the same as the approach described above in conjunction with FIG. 4. Although described herein with respect to a radius as a reference example, in some embodiments, the size or shape of a region of acceptance that is not spherical or circular (and does not have a radius) can be determined based on a function of a ratio between magnitudes of the linear hand inputs.

Illustratively, the composite linear input 510 (specifically, the tip of a vector representing the composite linear input 510) lies within the region of acceptance 506. In this example, the composite linear input 510 is a sum of linear hand inputs. In such a case, the control module sets a composite linear input equal to the composite linear input 510. That is, the composite linear input is computed based on the linear hand inputs 402 and 404, themselves, without the use of a virtual hand input, when the composite linear input 510 is within the region of acceptance 506 of a non-linear summation computed using a virtual hand input. Using the linear hand inputs 402 and 404 that are applied by the operator can result in a smoother motion of the display unit 206.

In other cases, when the sum of linear hand inputs extends outside of the region of acceptance 506, the control module sets the composite linear input 510 equal to a linear input (e.g., represented by a vector) within the region of acceptance 506; in an example, the composite linear input 510 is set equal to the linear hand input with a largest magnitude and a direction having a smallest angle relative to a direction of the linear hand inputs. Such a linear input can be represented by a vector whose tip lies on the (e.g., spherical or circular or linear range) boundary of the region of acceptance.

Figure 6:
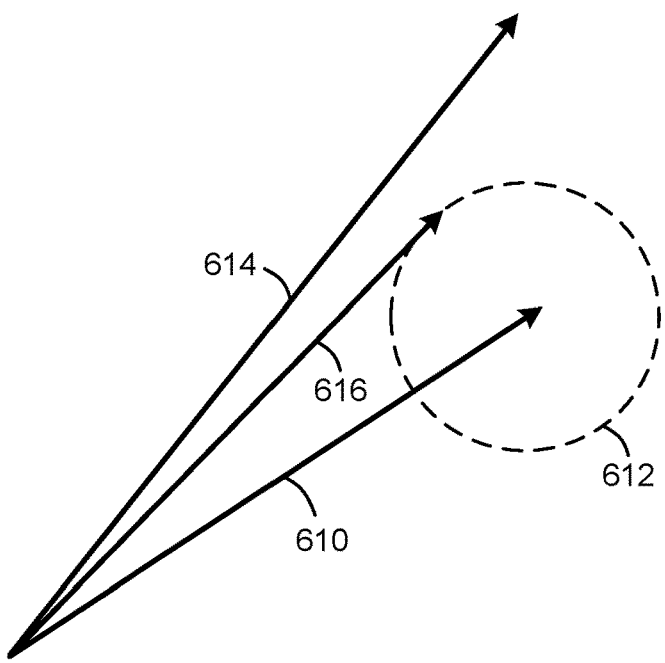
FIG. 6 illustrates an example in which the tip of a sum of linear hand inputs extends outside a region of acceptance, according to various embodiments.
Figure 7:
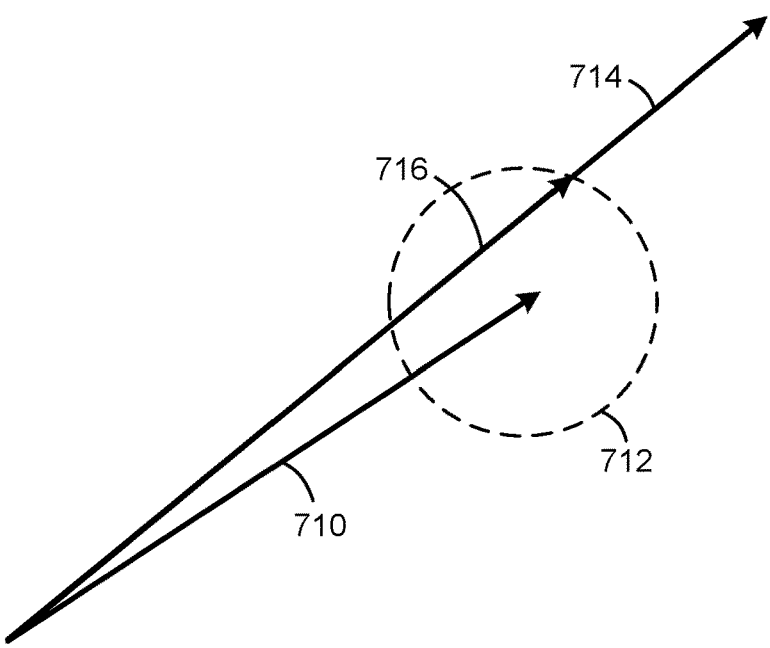
FIG. 7 illustrates another example in which the tip of a sum of linear hand inputs extends outside a region of acceptance, according to various embodiments.

FIGS. 6-7 illustrate two example cases in which the linear hand inputs extends outside the region of acceptance, according to various embodiments. As shown in FIG. 6, the of linear hand inputs 614 sensed by hand-input sensors 240*a*-*b* extends outside a region of acceptance 612 around the non-linear summation 610 of linear hand inputs. Accordingly, the control module sets a composite linear input equal to a linear input 616 that is within the region of acceptance 612 and has a largest magnitude and a direction forming a smallest angle with a direction of the sum of linear hand inputs 614. Illustratively, the tip of a vector representing the linear input 616 lies on the boundary of the region of acceptance 612, and the vector representing the linear input 616 is tangent to the boundary.

As shown in FIG. 7, a sum of linear hand inputs 714 sensed by hand-input sensors 240*a-b* extends outside a region of acceptance 712 around a non-linear summation 710 of the linear hand inputs. Accordingly, the control module sets a composite linear input equal to a linear input 716 that is within the region of acceptance 712 and has both a largest magnitude and a direction forming a smallest angle with a direction of the sum of linear hand inputs 714. In this example, the smallest angle is zero, because a vector representing the sum of linear hand inputs 714 passes through the region of acceptance 712. In other words, the linear input 716 has the same direction and a smaller magnitude compared to the sum of linear hand inputs 714. Illustratively, the tip of a vector representing the linear input 716 lies on the farther boundary of the region of acceptance 712.

Similar to the discussion above in conjunction with FIG. 4, the control module can compute a commanded motion for moving the display unit 206 based on the composite linear input 510. For example, the control module may determine a commanded position, commanded velocity, commanded acceleration, or other motion-related parameter based on the composite linear input 510 and use such motion-related parameter to compute the commanded motion. As a specific example, the commanded motion may comprise a linear velocity proportional to the composite linear input 510.

Figure 8:
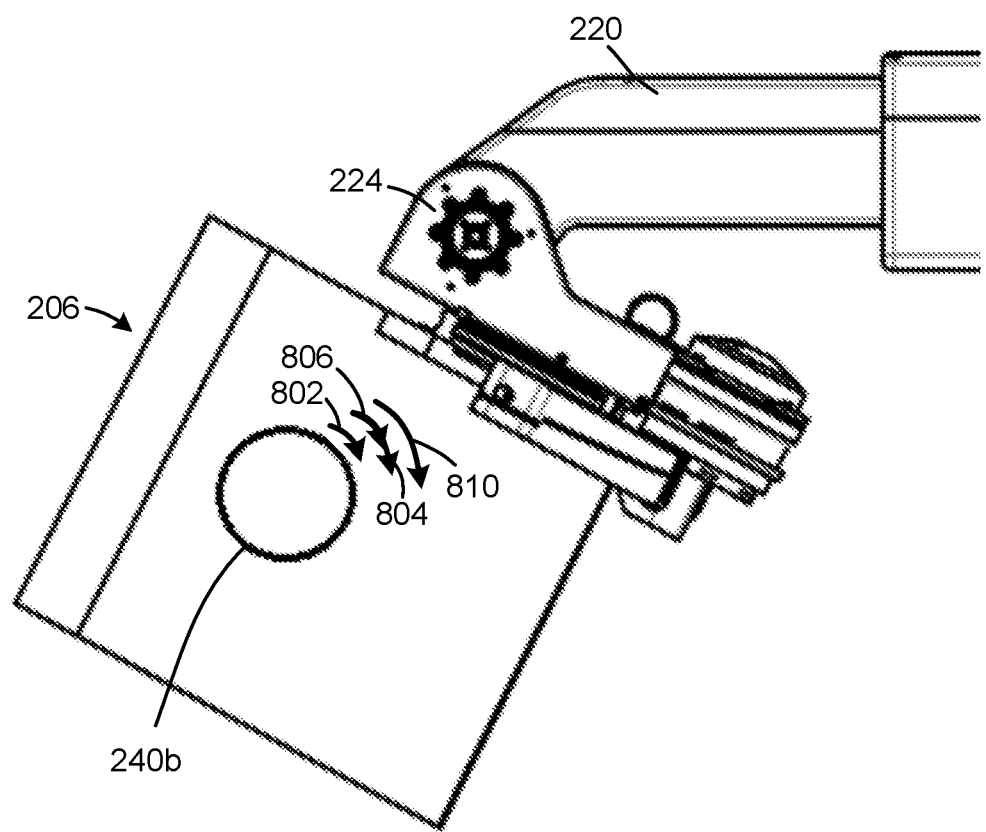
FIG. 8 illustrates an approach for combining rotational inputs sensed by hand-input sensors during an adjustment of a display unit, according to various embodiments.

FIG. 8 illustrates an approach for combining rotational hand inputs sensed by hand-input sensors 240*a-b* during an adjustment of the display unit 206, according to various embodiments. As shown, two example rotational/angular hand inputs 802 and 804 (also referred to herein as "rotational inputs 802 and 804") have been sensed by hand-input sensors 240*a-b* after an ergonomic adjustment mode is entered. In this example, the rotational hand inputs 802 and 804 are shown as rotational inputs with both a rotational magnitude and a rotational direction and are represented by arcuate arrows traversing around an axis of rotation. Although often described with respect to torques as an illustrative example, in various embodiments the rotational hand inputs 802 and 804 may comprise angular displacements, angular positions, angular velocities, and/or angular accelerations (also termed "rotational displacements," "rotational positions," "rotational velocities," and/or "rotational accelerations" herein). The hand-input sensors 240*a-b* may detect these parameters directly or detect a proxy from which the parameters can be derived (e.g. detect angular velocity over time and integrate to provide angular displacement or angular position). In still other embodiments, the linear hand inputs 402 and 404 may be derived using techniques used to aggregate, filter, or average sensor signals over space (e.g., from multiple sensing elements) or time.

Illustratively, in FIG. 8, the rotational hand inputs 802 and 804 are about an axis that passes through a center of knobs of the hand-input sensors 240*a-b* (e.g., the pitch axis 254 described above in conjunction with FIG. 2). In some embodiments, the repositionable structure to which the display unit 206 is mounted may enable the display unit 206 to move in multiple rotational DOFs. In such cases, the hand-input sensors may sense rotational hand inputs about different axes permitted by the multiple rotational DOFs.

To help increase the likelihood that the motion of the display unit produced in response to activations of the hand-input sensors are intended by the operator, a control module (e.g., the control module 170) performs checks to determine whether a criteria set is met and commands the motion of the display unit in response to the criteria set being met. The criteria set may include a single criterion, or a plurality of criteria. The discussion following FIG. 8 describes example criteria, and various embodiments may use criteria sets comprising one, two, or multiple ones of these example criteria.

In some embodiments, a criterion includes that each of the rotational hand inputs 802 and 804 has a magnitude that is less than a threshold magnitude. In such cases, the display unit 206 is not commanded to move when either of the rotational hand inputs 802 or 804 has a magnitude that is less than the threshold magnitude. As a result, activations (e.g., accidental activations) of the hand-input sensors 240*a-b* involving rotational hand inputs with magnitudes less than the threshold magnitude will not cause motion of the display unit 206. In some embodiments, a criterion includes that a combination of the rotational hand inputs 802 and 804, such as the non-linear summation described below, has a magnitude that is less than a threshold magnitude. In such cases, the display unit 206 is not commanded to move when the combination of the rotational hand inputs 802 and 804 has a magnitude that is less than the threshold magnitude.

In some embodiments, a criterion includes that the directions of the rotational hand inputs 802 and 804, or of components of the rotational hand inputs 802 and 804 about a particular axis, are the same (i.e., the rotational hand inputs 802 are both clockwise or counter-clockwise about the axis). As a result, activations of one of the hand-input sensors 240*a* or 240*b* that do not have the same rotational direction will not cause motion of the display unit 206. In some embodiments, the repositionable structure to which the display unit 206 is mounted may enable the display unit 206 to move in multiple rotational DOFs. In such cases, rather than determining whether the rotational hand inputs are in the same direction, the control module may determine whether an angle between the axes of rotation is less than a threshold angle.

In some embodiments, the criteria set may include a criterion that the magnitudes of the rotational hand inputs 802 and 804 differ by less than a maximum ratio. For example, the maximum ratio may be approximately five in some embodiments. In some embodiments, the criteria set may also include a criterion that the magnitudes of the rotational hand inputs 802 and 804 are less than or equal to a maximum magnitude associated with a maximum rotation velocity that the display unit 206 can achieve. In some examples, rotational hand inputs whose magnitude are greater than the maximum magnitude can be reduced in magnitude to the maximum magnitude.

In response to the criteria set being met, the control module determines a composite rotational input 810 using the rotational hand inputs 802 and 804. In some embodiments, the control module determines the composite rotational input 810 by combining the rotational hand inputs 802 and 804 using a non-linear summation. As shown, a magnitude of the rotational hand input 804 is larger than a magnitude of the rotational hand input 802. The non-linear summation (1) reduces the magnitude of the rotational hand input (e.g., a magnitude of a torque or a rotational displacement) 804 having the larger magnitude to the magnitude of the rotational hand input (e.g., a magnitude of a torque or a rotational displacement) 802 having the smaller magnitude while maintaining a same direction as the rotational hand input 804, thereby generating a virtual rotational hand input (e.g., a virtual torque or a virtual rotational displacement) 806, and (2) adds the virtual rotational hand input 806 to the rotational hand input 802 having the smaller magnitude to obtain the composite rotational input 810. In other embodiments in which the display unit 206 can move in multiple rotational DOFs, the rotational hand inputs may be added to obtain an intermediate rotational hand input (e.g., an intermediate torque), and a magnitude of the intermediate rotational hand input reduced according to a function of an angle between the directions of the rotational hand inputs to generate the composite rotational input 810. The function may be, e.g., a Gaussian function or a constant within a range of angular values and taper off in shoulder regions outside the range of angular values.

The control module can compute a commanded motion for the moving display unit 206 based on the composite rotational input 810. For example, the control module may determine a commanded angular position, commanded velocity, commanded acceleration, or other motion-related parameter based on the composite rotational input 810 and use such motion-related parameter to compute the commanded motion. As a specific example, the commanded motion may comprise a rotational velocity proportional to the composite rotational input 810.

Although linear and rotational hand inputs are described separately in conjunction with FIGS. 4-8, some embodiments accept hand inputs comprising both linear and rotational components and use such hand inputs to provide commanded motions with linear and rotational components. For example, some embodiments determine linear component(s) of the commanded motion using linear components of the hand inputs and the techniques described in conjunction with FIGS. 4-7, determine rotational component(s) of the commanded motion using rotational components of the hand inputs and the techniques described in conjunction with FIG. 8, and superimpose them to provide the overall commanded motion.

Figure 9:
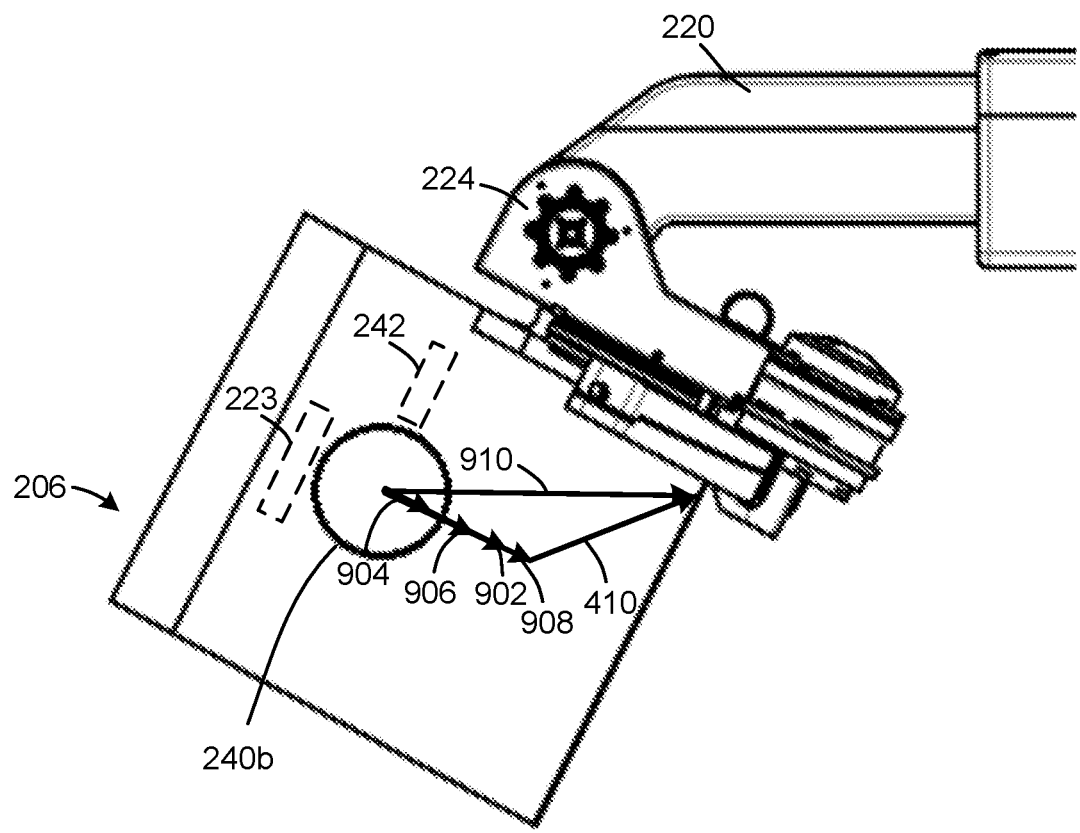
FIG. 9 illustrates an approach for combining input sensed by a head-input sensor with inputs sensed by hand-input sensors during an adjustment of a display unit, according to various embodiments.

FIG. 9 illustrates an approach for combining a head input sensed by a head-input sensor 242 with hand inputs sensed by hand-input sensors 240*a-b* during an adjustment of the display unit 206, according to various embodiments. As shown, a head input 902 has been sensed by the head-input sensor 242. For example, the head input 902 could be a force, a displacement, a position, a velocity, an acceleration, or other input that is applied by the head of an operator and sensed by the head-input sensor 242. In various embodiments, the head input comprises a linear head input, such as a linear force, linear displacements, linear velocities, linear accelerations, or some other physical parameter. In some embodiments, the head input further includes a rotational head input, such as torque, rotational displacement, rotational velocity, rotational acceleration, or some other physical parameter. In some embodiments, the head input 902 may be derived using techniques to aggregate, filter, or average sensor signals over space (e.g., from multiple sensing elements) or time.

Illustratively, in the example of FIG. 9, the head input 902 is a one-dimensional force in a direction toward and away from the operator and through the viewports 223 of the display unit 206. In some embodiments, the head-input sensor (e.g., the head-input sensor 242) is a one-DOF sensor that senses head inputs pushing the display unit 206 in a direction away from the operator, as shown in FIG. 9. In some embodiments, in the ergonomic adjustment mode, sufficient head force applied to the display unit 206 in the direction away from the operator would cause displacement of the display unit 206 in a direction of force applied by the operator. However, if the head force is reduced or removed as the operator moves backwards in the ergonomic adjustment mode, away from the display unit 206, the display unit 206 in some embodiments does not follow the operator backwards. Following motions of the head of the operator when the operator moves backward can be uncomfortable to the operator.

In response to the head input 902, a control module (e.g., the control module 170) compares the head input 902 to a baseline head input 904 to determine an adjusted head input 906. In some embodiments, the baseline head input 904 is a head input sensed by the head-input sensor 242 at the entry into the ergonomic adjustment mode. In some embodiments, the control module continuously or periodically updates the baseline head input 904 using the head input then sensed by the head-input sensor 242 and pauses updating the baseline head input 904 (i.e., maintains the baseline head input 904) when the system is in the ergonomic adjustment mode. In some embodiments, the control module computes the adjusted head input 906 by comparing the head input (e.g., a head force) 902 with the baseline head input (e.g., a baseline head force) 904. In some embodiments, the adjusted head input 906 is equal to a difference between the head input 902 and the baseline head input 904 (e.g., a head force equal to a difference between a head force of head input 902 and a head force of baseline head input 904). Using the difference between the sensed head input 906 and the baseline head input 904 can help provide a continuity of the force felt by the head of the operator when switching to the ergonomic adjustment mode, such as when switching from the steerable viewer mode. Although the above example discusses forces expressly, in some embodiments, the head input 902 comprises a head displacement, velocity, acceleration, or other head input parameter, and the adjusted head input 906 is based on a difference between the head input 902 and a corresponding baseline head input 904 comprising a head displacement, velocity, acceleration, or other head input parameter.

In some embodiments, when the sensed head input 902 is less than the baseline head input 904, the baseline head input 904 is reduced; as an example, a magnitude of the baseline head input 904 is reduced (such as to a magnitude of the sensed head input 902). However, when the sensed head input 902 is greater than the baseline head input 904, the baseline head input 904 is not increased. In this manner, the baseline head input 904 is "ratcheted" lower when the sensed head input 902 is less than the baseline head input 904.

In some embodiments, in response to the sensed head input 902 being greater than the baseline head input 904, the adjusted head input 906 is used to update a linear input (e.g., the composite linear input 410 or 510, or the linear input 616 or 716) determined based on hand inputs sensed by hand-input sensors 240*a-b*, thereby producing an updated composite linear input 910. In some embodiments, a head input 908 that is a scaled version of the adjusted head input 906 is added to the composite linear input 410 (or the composite linear input 510 or the linear inputs 616 or 716). The scaling may have a value that makes the adjusted head input 906 the primary definer of the direction or magnitude (e.g., such as defining more than 50%, or more than 75%) of motion of the display unit 206. For example, the adjusted head input could be scaled up by a factor of about 1.5-2.0 or another factor in some embodiments or modes of the same embodiment. Scaling up by greater than one can augment head and neck forces applied by the operator, can increase the responsiveness of the system, and can help to reduce fatigue in the head and neck of the operator. Illustratively, the scaled head input 908 is added to the composite linear input 410 or 510, or linear input 616 or 716, resulting in the updated composite linear input 910. In other embodiments or modes of the same embodiment, rather than scaling up the adjusted head input 906, composite linear input 410 or 510, or linear input 616 or 716 is scaled down (e.g., by a factor of 0.8-0.9 or another factor) and added to the adjusted head input 906. Scaling down by less than one can increase the accuracy of the system. In general, appropriate scaling of less than one, one, or more than one, can increase the usability or performance of the system.

Although FIG. 9 is described primarily respect to examples in which the head input is a linear head input, such as a force, in some embodiments the head input may include a rotational head input, such as a torque. In such cases, the control module (e.g., control module 170) may also store a baseline rotational head input that is sensed by head-input sensor 242 at the entry into the ergonomic adjustment mode and ratcheted lower when a sensed rotational head input is less than the baseline rotational head input. In addition, the control module may update a rotational input (e.g., composite rotational input 810) determined based on hand inputs sensed by hand-input sensors 240a-b, similar to the discussion above with respect to updating the linear head input, as described in detail below in conjunction with respect to FIGS. 10 and 14.

A commanded motion can then be computed from an updated composite input (e.g., the updated composite linear input 910) by itself, and/or with other input(s) such as the composite rotational input 810 (or an updated composite rotational input) in a manner similar to that described above for determining a commanded motion using composite linear inputs 410 or 510 and composite rotational input 810.

In the examples described in conjunction with FIGS. 4-7, inverse kinematics can be used to compute joint velocities or positions for joints associated with the display unit 206, and/or the repositionable structure to which the display unit 206 is mounted, that will move the display unit 206 toward achieving the commanded motions.

Figure 10:
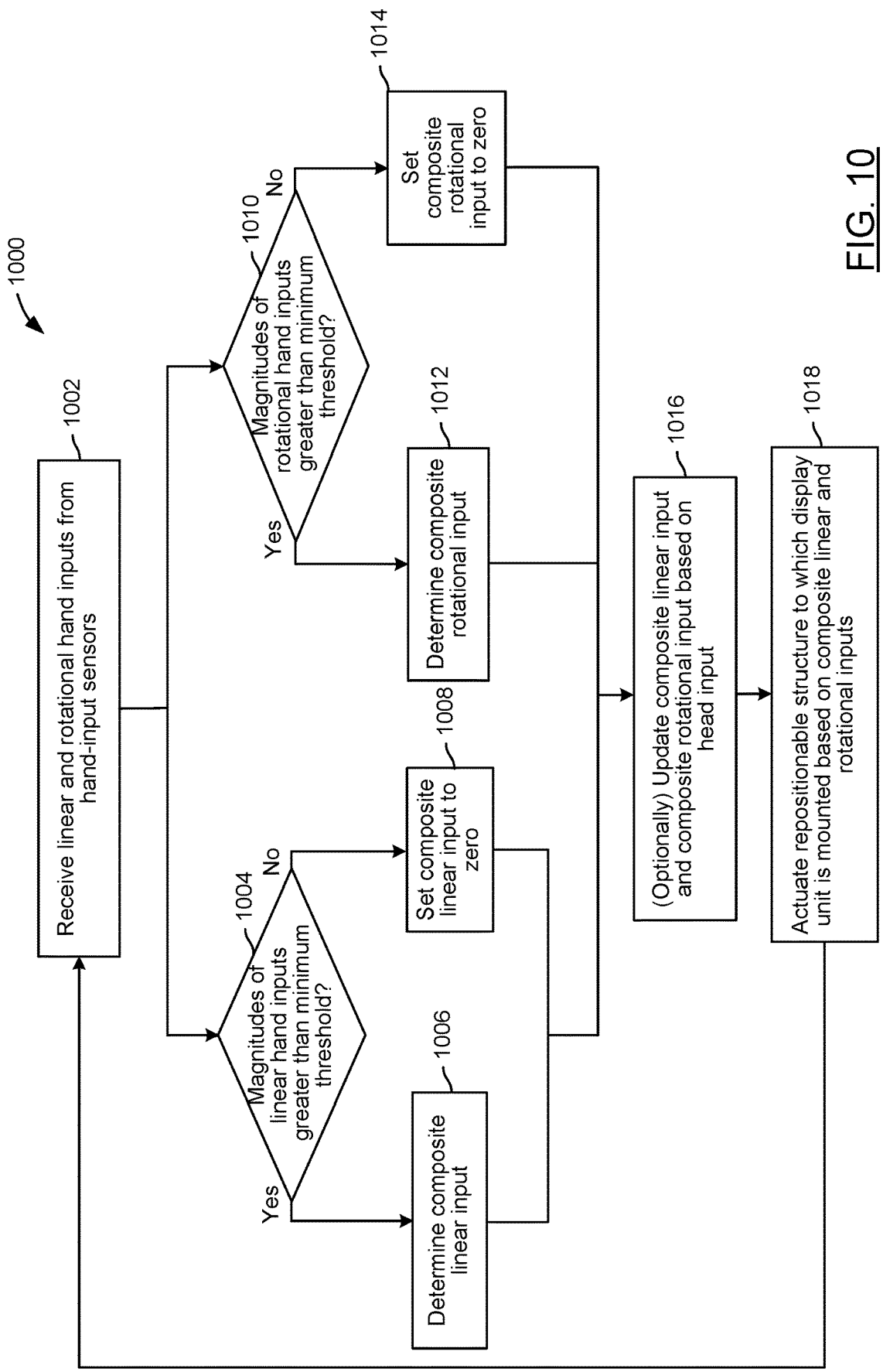
FIG. 10 illustrates a simplified diagram of a method for adjusting the display unit of a viewing system, according to various embodiments.

FIG. 10 illustrates a simplified diagram of a method 1000 for adjusting the display unit in a viewing system, according to various embodiments. One or more of the processes 1002-1010 of method 1000 may be implemented, at least in part, in the form of executable code stored on non-transitory, tangible, machine readable media that when run by one or more processors (e.g., the processor 150 in control system 140) may cause the one or more processors to perform one or more of the processes 1002-1018. In some embodiments, method 1000 may be performed by one or more modules, such as control module 170. In some embodiments, method 1000 may include additional processes, which are not shown. In some embodiments, one or more of the processes 1002-1018 may be performed, at least in part, by one or more of the units of control system 140.

As shown, the method 1000 begins at process 1002, where linear and rotational hand inputs (e.g., linear hand inputs 402 and 404 and rotational hand inputs 802 and 804) are received from the hand-input sensors 240a and 240b. Any technically feasible signal conditioning may be applied in some embodiments. For example, a low-pass filter could be applied to reduce noise in the hand input measurements received from the hand-input sensors 240a-b. Method 1000 then processes the linear hand inputs (see process 1004) separately from the rotational hand inputs (see process 1010).

At process 1004, when the magnitudes of the linear hand inputs are greater than a minimum threshold, then the method 1000 continues to process 1006.

Figure 11:
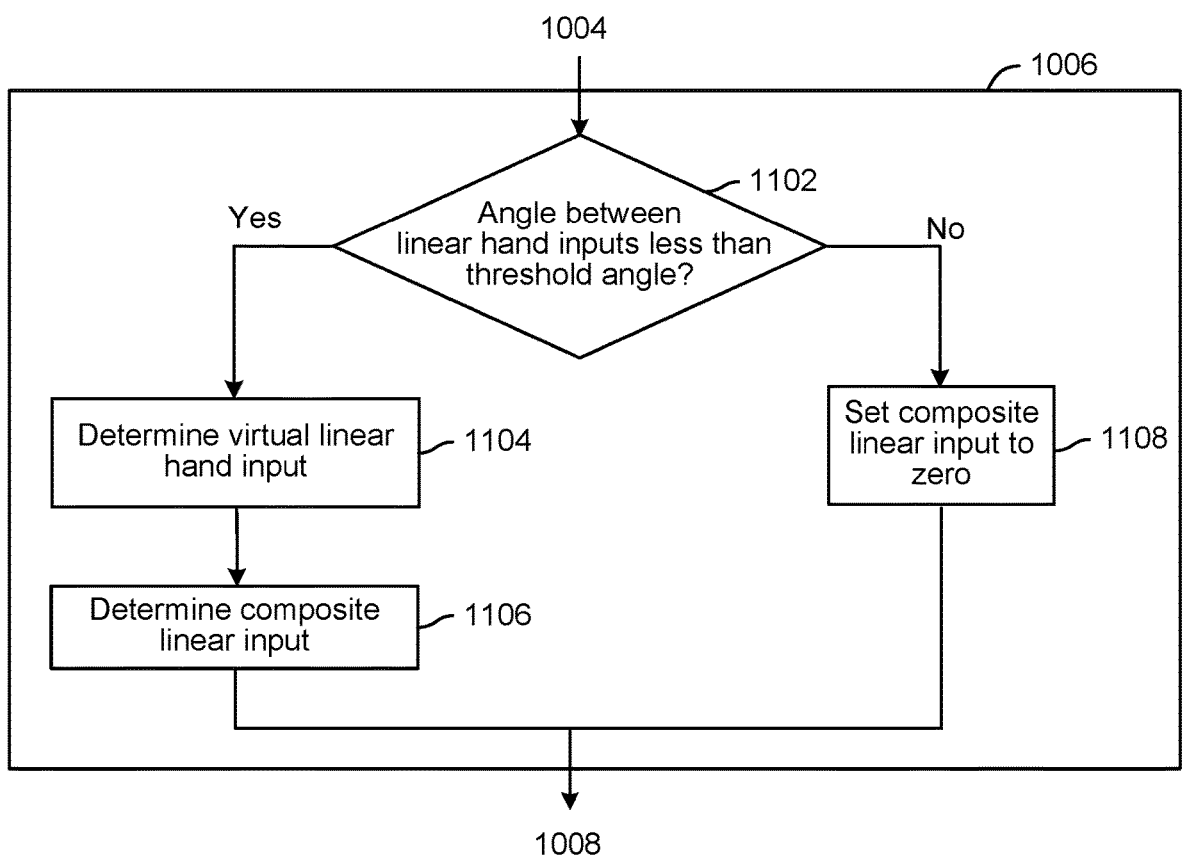
FIG. 11 illustrates in greater detail one process of the method of FIG. 10, according to various embodiments.

At process 1006, a composite linear input (e.g., a composite force) is determined. In some embodiments, the composite linear input is determined using one of the techniques described below in conjunction with FIGS. 11-13. FIG. 11 illustrates in greater detail process 1006 of the method 1000, according to various embodiments. As shown, at process 1102, when an angle (e.g., angle 406) between directions of the linear hand inputs (e.g., linear hand inputs 402 and 404) is less than a threshold angle, then the method 1000 continues to process 1104. Alternatively, when the angle between the directions of the linear hand inputs and is not less than the threshold angle, then the method 1000 continues to process 1108. In some embodiments in which the display unit 206 is restricted to move with one linear DOF, the directions of the linear hand inputs should be the same direction along the one linear DOF in order to proceed to process 1104.

At process 1104, a virtual linear hand input (e.g., a virtual linear hand input 408) is determined. In some embodiments, the virtual linear hand input is determined by reducing a magnitude of the linear hand input having a larger magnitude to a magnitude of the linear hand input having a smaller magnitude.

At process 1106, a composite linear input (e.g., composite linear input 410) is determined. In some embodiments, the composite linear input is determined by adding the virtual linear hand input to the linear hand input having the smaller magnitude.

Alternatively, when the angle between the directions of the linear hand inputs is not less than the threshold angle and the method 1000 continues to process 1108, the composite linear input is set to zero.

Figure 12:
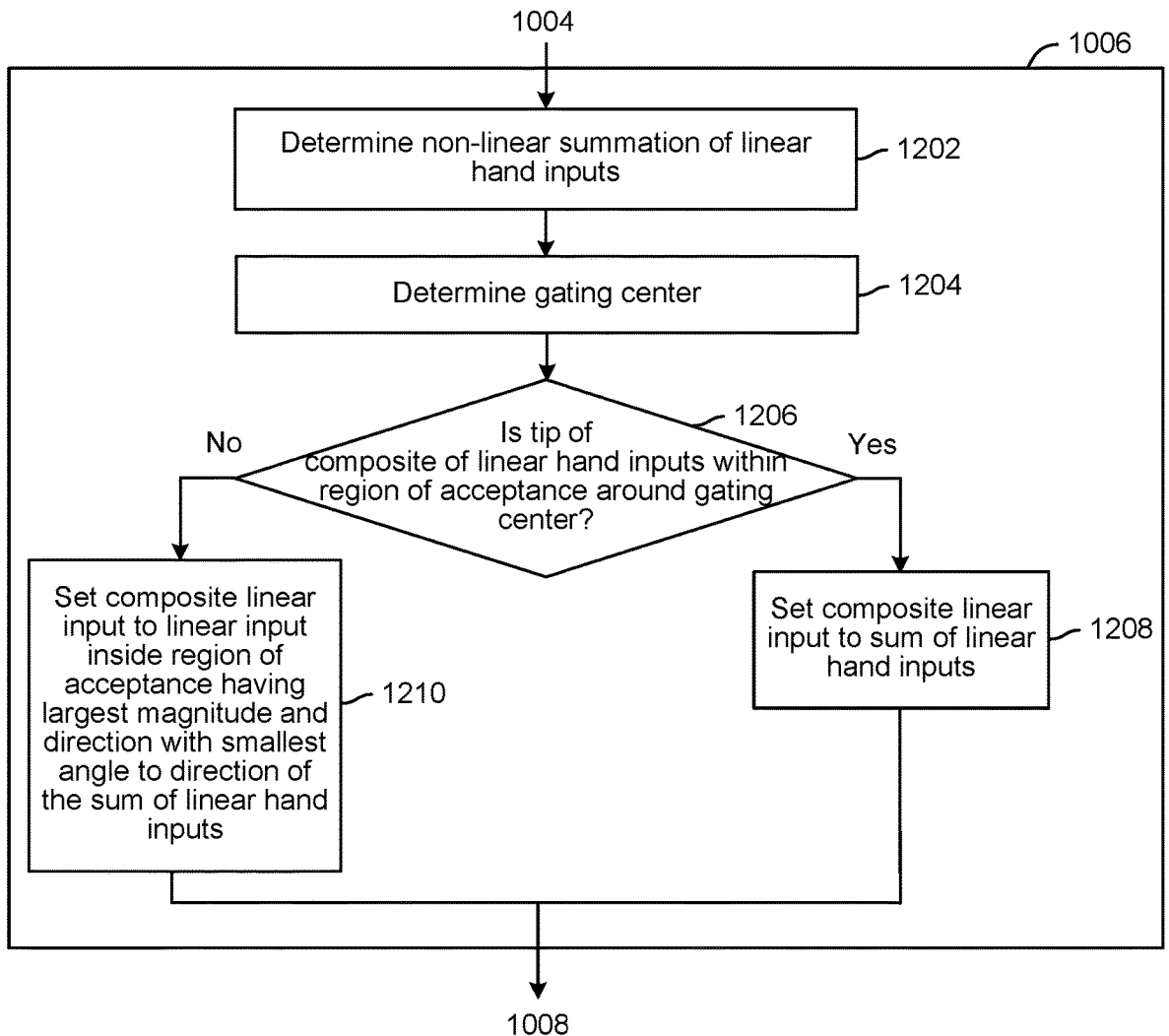
FIG. 12 illustrates in greater detail the same process of the method of FIG. 10, according to various other embodiments.

FIG. 12 illustrates in greater detail process 1006 of the method 1000, according to various other embodiments. As shown, at process 1202, a non-linear summation (e.g., non-linear summation 502) of the linear hand inputs (e.g., linear hand inputs 402 and 404) is determined. In some embodiments, the non-linear summation may be determined by adding a virtual linear hand input to the linear hand input having the smaller magnitude, similar to the description above in conjunction with processes 1104 and 1106.

At process 1204, a gating center (e.g., gating center 504) is determined. In some embodiments, the gating center is determined by scaling a magnitude of the non-linear summation, while maintaining a direction of the non-linear summation; in this example, the non-linear summation is determined at process 1202. In such cases, the non-linear summation can be scaled according to a function (e.g., a Gaussian function or a constant function with shoulder regions that decrease to zero) of the difference in directions between the linear hand inputs and measured by the hand-input sensors 240a-b.

At process 1206, when a composite of the linear hand inputs (e.g., composite linear input 510) lies within a region of acceptance (e.g., region of acceptance 506) around the gating center, then the method 1000 continues to process 1208, where a composite linear input is set to the composite of the linear hand inputs. As described, a composite of the linear hand inputs that is a straight sum, a weighted sum, or any other technically feasible composite may be used in some embodiments. In some embodiments, the region of acceptance is a region centered on the tip of a vector representing the gating center and extending out a radius that is determined as a function (e.g., a constant function with a shoulder region that decreases to a minimum radius) of a ratio between magnitudes of the linear hand inputs.

Alternatively, when the composite of the linear hand inputs extends outside of the region of acceptance around the gating center, then the method 1000 proceeds to process 1210, where the composite linear input is set to a linear input (e.g., linear input 616 or 716) inside the region of acceptance that has a largest magnitude and a direction forming a smallest angle with a direction of the sum of the linear hand inputs.

Figure 13:
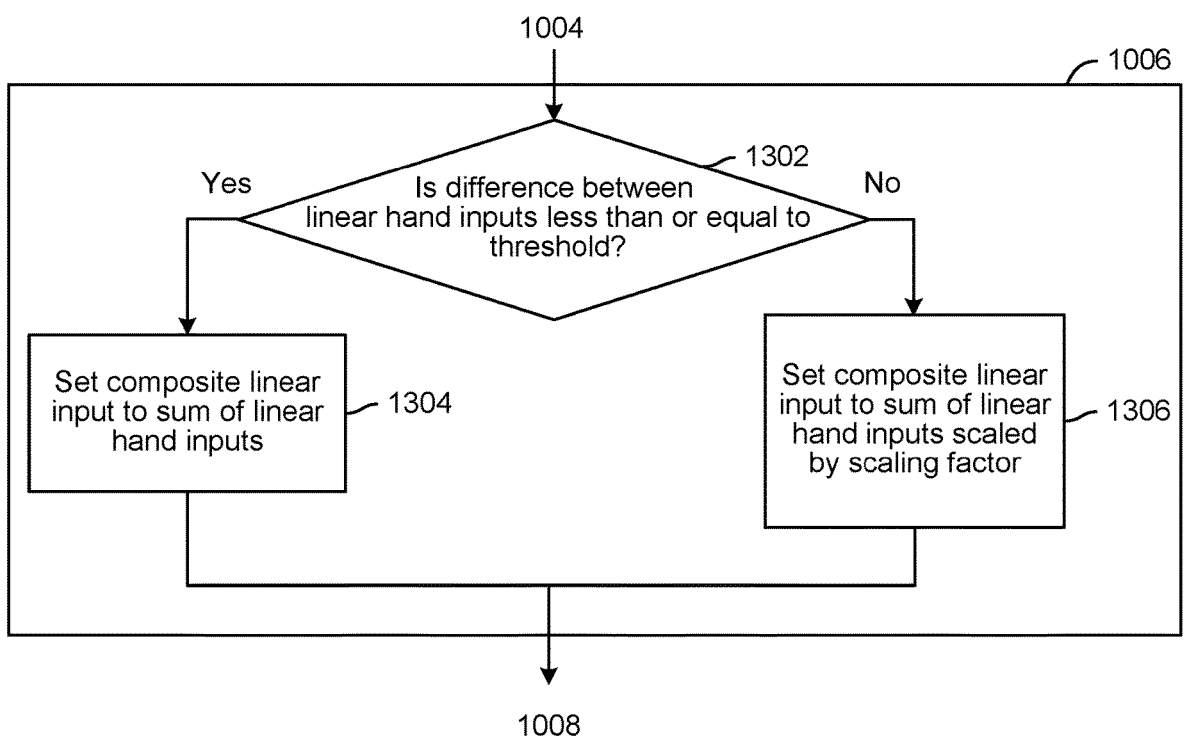
FIG. 13 illustrates in greater detail the same process of the method of FIG. 10, according to various other embodiments.

FIG. 13 illustrates in greater detail process 1006 of the method 1000, according to various other embodiments. In some embodiments, processes 1004 and 1008 can be skipped, disregarded, or disabled (such as by being set to zero or a minimum detectable level by hardware, or by skipping or disregarding the results of a check against the minimum magnitude) in some cases when the techniques of FIG. 13 are used to implement process 1006. For example, processes 1004 and 1008 could be skipped to enable single-handed adjustment of the display unit 206, in which case the magnitude of a linear hand input associated with the other hand is zero.

As shown, at process 1302, when a difference between the linear hand inputs (e.g., linear hand inputs 402 and 404) is less than or equal to a threshold, then the method 1000 continues to process 1304, where the composite linear input is set to a sum of the linear hand inputs. For example, the linear hand inputs could be multi-dimensional and represented by two vectors, and the magnitude of a vector that is a difference between the two vectors could be compared with the threshold. When the magnitude of the difference vector is less than the threshold, then the two vectors are added together. As another example, the linear hand inputs could be one-dimensional and representing by two scalars, and a difference between the two scalars could be compared with the threshold. When the magnitude of the difference between the two scalars is less than the threshold, then the two scalars are added together. In some embodiments, the threshold can be based on a type of the display unit 206, a mathematical model of the hand-input sensors 240*a* and 240*b* and the display unit 206, and/or operator preference. For example, the threshold can be between 1-10 Newtons in some embodiments.

Alternatively, when the difference between the linear hand inputs is greater than the threshold amount, then at process 1306, the composite linear input is set to a sum of the linear hand inputs scaled by a scaling factor. In some embodiments, the composite linear input can be computed as:

$$F_{merge} = \alpha(F_1 + F_2), \text{ where } \alpha = \begin{cases} 1, & \|F_1 - F_2\| \leq K \\ \dfrac{K}{\|F_1 - F_2\|}, & \|F_1 - F_2\| > K \end{cases}$$

where $F_{merge}$ is the composite linear input, $F_1$ and $F_2$ are the linear hand inputs, K is the threshold, and $\alpha$ is the scaling factor.

In some embodiments, the technique for determining the composite linear input described above in conjunction with FIG. 13 is particularly useful when the linear hand inputs are relatively small, in which case the difference between the linear hand inputs may be less than the threshold, and the linear hand inputs are added together even when directions of the linear hand inputs differ significantly. For example, the small linear hand inputs could correspond to fine hand movements by the operator, and the operator may make fine hand movements in different directions or using only one hand.

Although the techniques of FIGS. 11-13 are described above as being used in different embodiments to determine the composite linear input at process 1006, some embodiments can permit switching between the techniques described above in conjunction with FIGS. 11-13 based on, for example, operator preference, magnitudes of the linear hand inputs, and/or the like.

Returning to FIG. 10, when the magnitudes of the linear hand inputs are not greater than the minimum threshold at process 1004, then the method 1000 continues to process 1008, where a composite linear input is set to zero.

At process 1012, when the magnitudes of the rotational hand inputs (e.g., magnitudes of the rotational hand inputs 802 and 804) are greater than a minimum threshold, then the method 1000 continues to process 1012. In some embodiments, processes 1010-1014 are performed in parallel with processes 1004-1008, although processes 1004-1008 and 1010-1014 may be performed serially in other embodiments.

Figure 14:
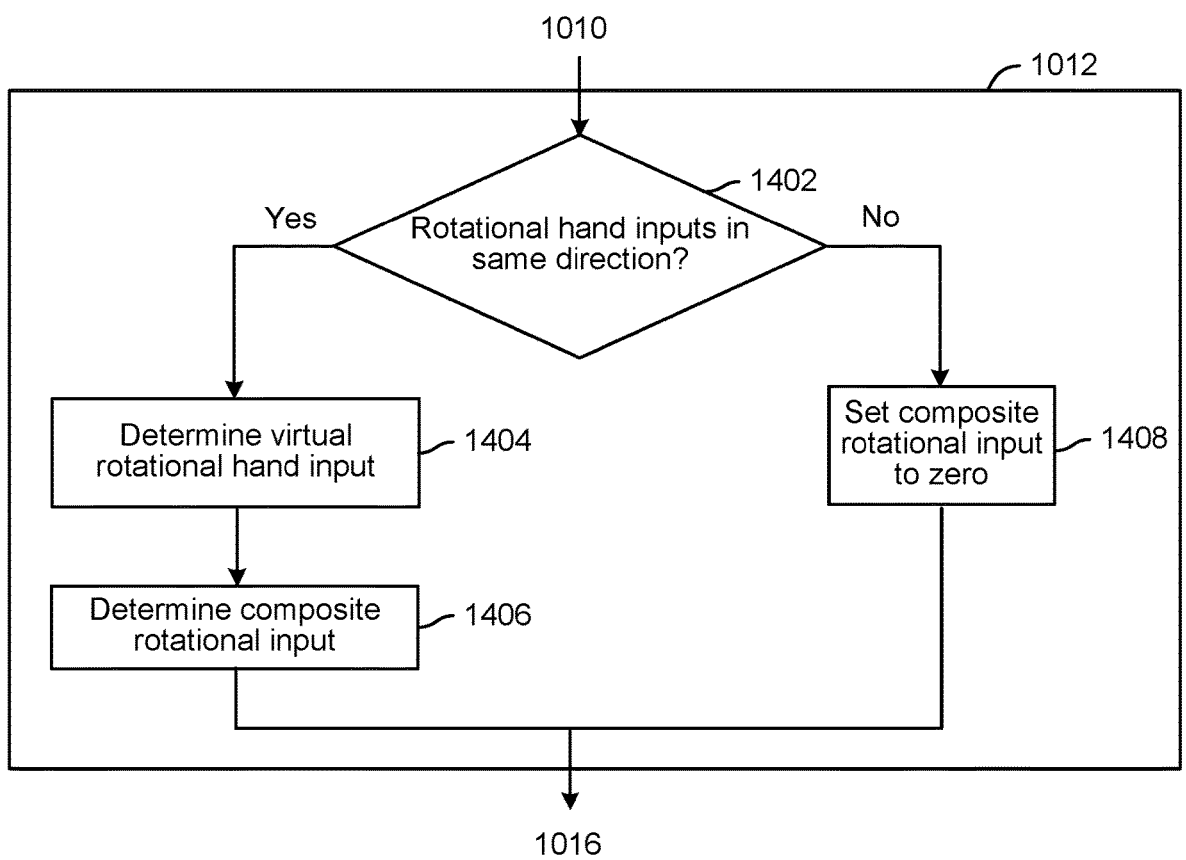
FIG. 14 illustrates in greater detail another process of the method of FIG. 10, according to various embodiments.

At process 1012, a composite rotational input (e.g., composite rotational input 810) is determined. FIG. 14 illustrates in greater detail process 1012 of the method 1000, according to various embodiments. As shown, at process 1402, when the rotational hand inputs (e.g., rotational hand inputs 802 and 804) are in the same direction, such as rotational hand inputs that are both clockwise or counter-clockwise about an axis, then the method 1000 continues to process 1404. Alternatively, when the rotational hand inputs are in different directions, then the method 1000 continues to process 1408. In some embodiments in which the display unit 206 can rotate about multiple different axes, the directions of the rotational hand inputs should be less than a threshold angle in order to proceed to process 1304.

At process 1404, a virtual rotational input (e.g., virtual rotational hand input 806) is determined. In some embodiments, the virtual rotational hand input is determined by reducing a magnitude of one of the rotational hand inputs having a larger magnitude to a magnitude of the other rotational hand input having a smaller magnitude.

At process 1406, a composite rotational input (e.g., composite rotational input 810) is determined. In some embodiments, the composite rotational input is determined by adding the virtual rotational hand input to the rotational hand input having the smaller magnitude.

Alternatively, when the rotational hand inputs are not in the same direction and the method 1000 continues to process 1408, where the composite rotational input is set to zero.

Although FIG. 10 and processes 1004-1008 are described above with respect to linear hand inputs interpreted as forces applied to hand-input sensors 240*a* and 240*b*, in some embodiments, the linear hand inputs can be interpreted as torques applied to display unit 206 that are intended to rotate display unit 206 (e.g., to yaw and/or roll display unit). In such cases, each linear hand input can be computed as a torque (or angular displacement, angular position, angular velocity, and/or angular acceleration) about a virtual center. In some embodiments, the virtual center can be a point located between and in front of the eyes of an operator, such as the center point of a line between the hand-input sensors 240*a* and 240*b*. Accordingly, in addition to contributing to translational motion of the display unit 206, the linear hand inputs can also contribute to a rotational input used to rotate the display unit 206. When the torques corresponding to the linear hand inputs are greater than the minimum threshold at process 1004, one or more of the non-linear summatation techniques, described above in conjunction with FIGS. 11-13, can be applied at process 1006 to determine a composite linear input that is a composite torque about the virtual center. When the torques corresponding to the linear hand inputs are not greater than the minimum threshold at process 1004, the composite linear input is set to zero at process 1008. Then, multi-dimensional rotational motions of the display unit 206, including yaw and roll about the virtual center, can be determined based on the composite linear input according to processes 1016 and 1018, described in greater detail below.

Returning to FIG. 10, when the magnitudes of the rotational hand inputs are not greater than a minimum threshold at process 1010, then the method 1000 continues to process 1014, where a composite rotational input is set to zero.

Figure 15:
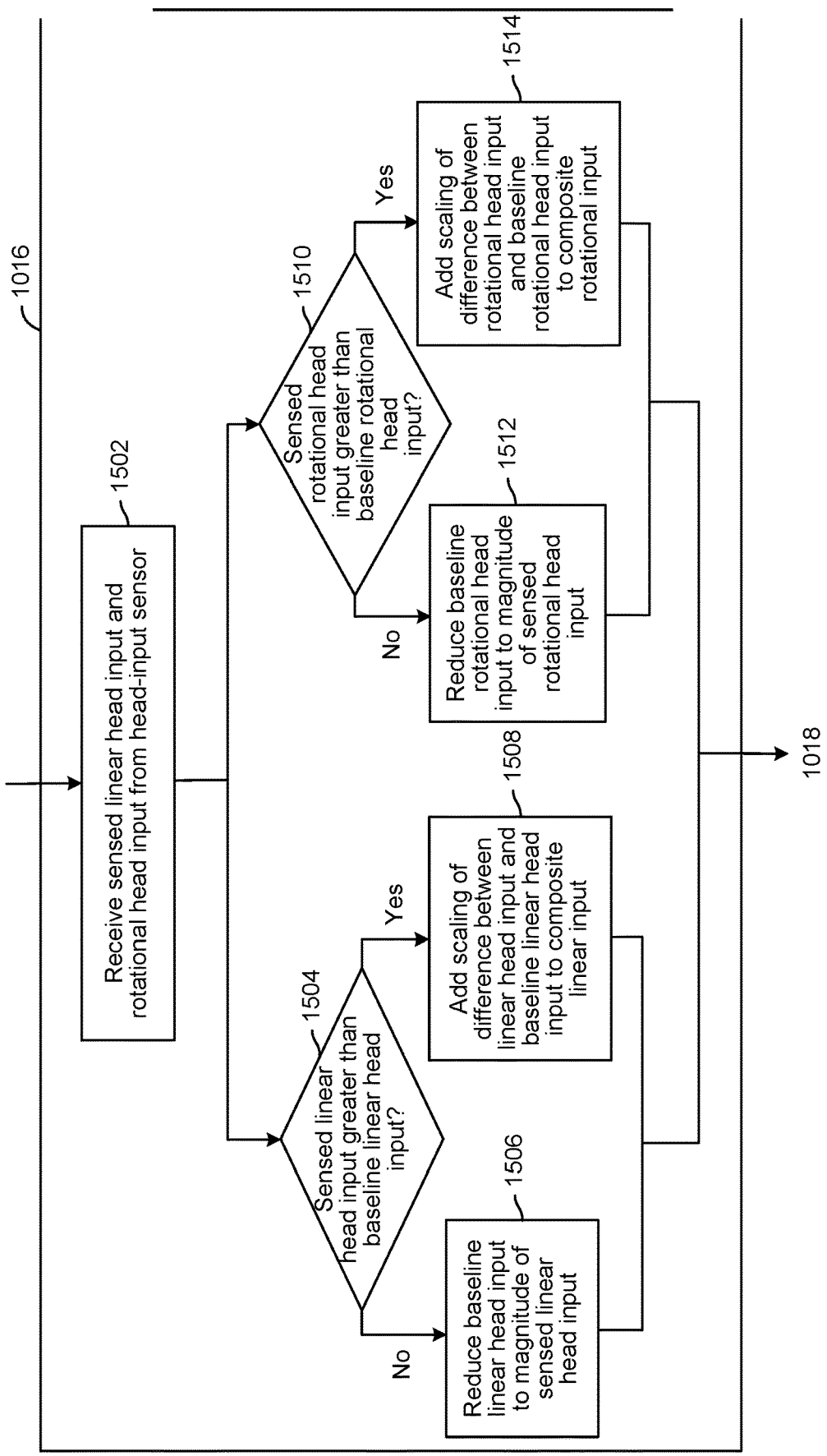
FIG. 15 illustrates in greater detail another process of the method of FIG. 10, according to various embodiments.

At an optional process 1016, the composite linear input, determined at process 1006 or 1008, and the composite rotational input, determined at process 1012 or 1014, are updated based on a head input (e.g., a head force and/or a head torque). FIG. 15 illustrates in greater detail process 1016 of the method 1000, according to various embodiments. As shown, at process 1502, a sensed linear head input and/or a rotational head input (e.g., head input 902) are received from a head-input sensor (e.g., head-input sensor 242). Any technically feasible signal conditioning may be applied in some embodiments. For example, a low-pass filter could be applied to reduce noise in the sensed linear and/or rotational head inputs received from the head-input sensor 242.

At process 1504, when the sensed linear head input is less than a baseline linear head input (e.g., baseline head input 904), then the method 1000 continues to process 1506, where a magnitude of the baseline linear head input is reduced to a magnitude of the sensed linear head input. It should be noted that, when the sensed linear head input is less than the baseline linear head input, the display unit 206 is not commanded to move based on the sensed linear head input toward the head of the operator. Moving the display unit 206 toward the head of the operator can be uncomfortable to the operator.

Alternatively, when the sensed linear head input is greater than the baseline linear head input, then the method 1000 continues to process 1508, where a scaled version (e.g., scaled head input 908) of a difference between the sensed linear head input and the baseline linear head input is added to a linear input (e.g., composite linear input 410 or 510, or linear input 616 or 716), determined at process 1006 or 1008, to update the linear input. In some embodiments, the difference between the sensed linear head input and the baseline linear head input may be scaled up by a factor, such as about 1.5, and added to the composite linear input that is determined at process 1006 or 1008; the linear input that is updated is determined based on linear hand inputs from the hand-input sensors 240*a*-*b*.

At process 1510, when the sensed rotational head input is less than a baseline rotational head input, then the method 1000 continues to process 1512, where a magnitude of the baseline rotational head input is reduced to a magnitude of the sensed rotational head input. In some embodiments, processes 1504-1508 are performed in parallel with processes 1510-1514, although processes 1504-1508 and 1510-1514 may be performed serially in other embodiments. When the sensed rotational head input is less than the baseline rotational head input, the display unit 206 is also not commanded to move based on the sensed rotational head input.

Alternatively, when the sensed rotational head input is greater than the baseline rotational head input, then the method 1000 continues to process 1514, where a scaled version of a difference between the sensed rotational head input and the baseline rotational head input is added to a rotational input (e.g., composite rotational input 810), determined at process 1012 or 1014, to update the rotational input. The difference between the sensed rotational head input and the baseline rotational head input may be scaled by any technically feasible factor and added to the composite linear input that is determined at process 1012 or 1014. In other embodiments, the sensed rotational head input may be discarded by, e.g., setting the scaling factor to 0, or a rotational head input may not be sensed.

Returning to FIG. 10, at process 1018, a repositionable structure to which the display unit is mounted is actuated based on the composite linear input and the composite rotational input. In some embodiments, commanded linear and rotational velocities are computed from the composite linear input determined during processes 1006 and/or 1008 and the composite rotational input determined during processes 1012 and/or 1014. When the composite linear input is generated based on interpreting the linear hand inputs as linear inputs (e.g., forces) applied to the input devices, then the composite linear input can be used to determine a commanded linear velocity for the repositionable structure. When the composite linear input is generated based on interpreting the linear hand inputs as rotational inputs (e.g., torques about a virtual center), then the composite linear input can be used to determine a contribution to a commanded rotational velocity for the repositionable structure about a point corresponding to the virtual center. In some embodiments, the linear hand inputs can be used to determine both the commanded linear velocity and the contribution to the commanded rotational velocity. The composite rotational input can also be used to determine an additional contribution to the commanded rotational velocity that is combined with the contribution determined from the composite linear input. Inverse kinematics can then be used to compute joint velocities of the display unit 206, and/or a repositionable structure to which the display unit 206 is mounted, for moving the display unit 206 to achieve the commanded linear and rotational velocities. Method 1000 then repeats by returning to process 1002.

As discussed above and further emphasized here, FIG. 10 is merely an example which should not unduly limit the scope of the claims. One of ordinary skill in the art would recognize many variations, alternatives, and modifications. As described, one or more other criteria may be included instead, or in addition, in some embodiments. For example, the other criteria could include that the linear hand inputs and/or the rotational hand inputs differ by less than a threshold ratio. As another example, the other criteria could include that the linear hand inputs and/or the rotational hand inputs are less than corresponding maximum values.

In some embodiments, in process 1006, a composite linear input may alternatively be determined by adding linear hand inputs to obtain an intermediate linear hand input and reducing a magnitude of the intermediate linear hand input according to a function of an angle between directions of the linear hand inputs to obtain the composite linear input. Any technically feasible function of the angle between the directions of the linear hand inputs can be used, such as a Gaussian function or a function that is constant within a range of angular values and tapers off in shoulder regions outside the range of angular values.

In some embodiments in which the display unit 206 can rotate about multiple different axes, a composite rotational input can be determined in process 1012 by reducing a magnitude of an intermediate rotational hand input that is the sum of the rotational hand inputs according to a function of an angle between the rotational hand inputs. Once again, any technically feasible function of the angle between the directions of the rotational hand inputs can be used, such as a Gaussian function or a function that is constant within a range of angular values and tapers off in shoulder regions outside the range of angular values. In some embodiments, component(s) of linear and/or rotational hand inputs that are not in direction(s) corresponding to a DOF of the display unit 206 may be discarded. In some embodiments, process 1004 of the method 1000 may be replaced with a determination of whether magnitudes of combinations of the linear and rotational inputs are greater than respective thresholds.

In some embodiments in which the display unit 206 can rotate about multiple different axes, a composite rotational input can be determined in process 1012 in a similar manner to the determination of the composite linear input based on a region of acceptance described above in conjunction with FIGS. 5-7 and 12.

As described in various ones of the disclosed embodiments, when a criteria set is met, a repositionable structure to which the display unit of a viewing system is mounted is actuated based on inputs measured by hand-input sensors. The criteria set may include that the directions between two linear hand inputs (e.g., hand forces) measured by different hand-input sensors are less than a threshold angle, and the directions of two rotational hand inputs (e.g., hand torques) measured by the hand-input sensors are in a same direction. The criteria set may also include that the measured linear hand inputs and the measured rotational hand inputs have more than a minimum magnitude, among other things. In some embodiments, the measured linear hand inputs are combined in a non-linear summation, in which a linear hand input having a larger magnitude is reduced in magnitude to a magnitude of the linear hand input having a smaller magnitude, thereby generating a virtual linear hand input. In addition, a rotational hand input having a larger magnitude is reduced in magnitude to a magnitude of the rotational hand input having a smaller magnitude, thereby generating a virtual rotational hand input. Thereafter, the virtual linear hand input is added to the linear hand input having the smaller magnitude to obtain a composite linear input, and the virtual rotational hand input is added to the rotational hand input having the smaller magnitude to obtain a composite rotational input. In other embodiments, a composite linear input can be determined by: (i) computing a non-linear summation of the linear hand inputs, (ii) scaling the non-linear summation to obtain a gating center, and (iii) setting the composite linear input to a summation of the linear hand inputs if that sum is within an acceptance region around the gating center, or setting the composite linear input to a linear input within the acceptance region such that the composite linear input has a largest magnitude available within the acceptance region and a direction forming a smallest angle with a direction of the summation of the linear hand inputs. A repositionable structure to which the display unit is mounted can then be actuated based on the composite linear input and the composite rotational input. In some embodiments, the repositionable structure to which the display unit is mounted is further actuated based on inputs measured by a head-input sensor. In some examples, the head-input sensor measures a head input (e.g., a head force) that is determined as the difference between a sensed head input and a baseline head input measured when an ergonomic adjustment mode is entered. In such cases, the composite linear input that is determined based on linear hand inputs can be updated based on the head input. In addition, the baseline head input is ratcheted back when the sensed head input or is less than the baseline head force.

The disclosed techniques can help improve the usability of ergonomic controls for moving a display unit of a viewing system, to help determine if input by an operator is intentional, to reduce unintended motion of a display unit, and/or the like, when input is detected by a hand-input sensor. In some embodiments that include a head-input sensor, inputs from the hand-input sensors can be further used with inputs from the head-input sensor. In such cases, the criteria set can include one or more criteria that reduce the likelihood of unintentional motion of the display unit toward the head of an operator.

Some examples of control systems, such as control system 140 may include non-transitory, tangible, machine readable media that include executable code that when run by one or more processors (e.g., processor 150) may cause the one or more processors to perform the processes of method 1000 and/or the processes of FIGS. 10, 11, 12, 13, and/or 14. Some common forms of machine readable media that may include the processes of method 1000 and/or the processes of FIGS. 10, 11, 12, 13, and/14 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A computer-assisted device comprising:
a repositionable structure configured to support a display unit, the repositionable structure comprising an actuator configured to move the repositionable structure, the display unit configured to display images viewable by an operator;
first and second hand-input sensors configured to receive inputs from the operator; and
a control unit communicably coupled to the repositionable structure, the first hand-input sensor, and the second hand-input sensor;
wherein the control unit is configured to:
receive a first input from the first hand-input sensor,
receive a second input from the second hand-input sensor,
in response to either a first magnitude of the first input being less than or equal to a first threshold or a second magnitude of the second input being less than or equal to the first threshold, prevent the actuator from moving the repositional structure based on the first input or the second input, and in response to satisfaction of a criteria set, the criteria set comprising that the first magnitude of the first input is greater than the first threshold and second magnitude of the second input is greater than the first threshold:
  determine a commanded motion based on the first input and the second input; and
  command the actuator to move the repositionable structure based on the commanded motion.

2. The computer-assisted device of claim 1, wherein the criteria set further comprises that a difference between a first direction of the first input and a second direction of the second input is less than a second threshold.

3. The computer-assisted device of claim 1, wherein the first magnitude is larger than the second magnitude, and wherein the control unit is configured to determine the commanded motion by:
  determining a commanded magnitude of the commanded motion based on a combination of the second input and a scaled first input, the scaled first input being a scaling of the first input based on at least one of the first magnitude or the second magnitude.

4. The computer-assisted device of claim 3, wherein the control unit is configured to determine the commanded motion by:
  determining a third input based on the first and second inputs;
  generating a fourth input by scaling the third input based on directions of the first and second inputs;
  in response to a combination of the first and second inputs being within a region around the fourth input, determining the commanded magnitude based on the combination; and
  in response to the combination being outside the region, determining the commanded magnitude based on a fifth input, wherein the fifth input is within the region.

5. The computer-assisted device of claim 4, wherein the control unit is further configured to determine a size or shape of the region around the fourth input based on a ratio between the first and second inputs.

6. The computer-assisted device of claim 1, wherein the control unit is configured to determine the commanded motion by:
  in response to a difference between the first and second inputs being less than or equal to a second threshold, determining the commanded motion based on a sum of the first and second inputs; and
  in response to the difference between the first and second inputs being greater than the second threshold, determining the commanded motion based on the sum of the first and second inputs and a scaling factor.

7. The computer-assisted device of claim 1, wherein to determine the commanded motion based on the first and second inputs, the control unit is configured to:
  discard a component of the first input or the second input, wherein the component is in a direction that the display unit cannot move.

8. The computer-assisted device of claim 1, further comprising a head-input sensor, wherein the control unit is further configured to:
  receive a sixth input from the head-input sensor; and
  determine the commanded motion further based on the sixth input.

9. The computer-assisted device of claim 8, wherein the control unit is further configured to:
  in response to determining that a magnitude of the sixth input is not less than a baseline magnitude:
    generate a fourth input by subtracting the magnitude of the sixth input from the baseline magnitude, and
    determine the commanded motion based on a scaling of the fourth input and a combination of the first and second inputs.

10. The computer-assisted device of claim 1, wherein the criteria set further comprises: a ratio between the first magnitude of the first input and the second magnitude of the second input being less than a threshold ratio.

11. The computer-assisted device of claim 1, wherein the criteria set further comprises: a magnitude of a combination of the first and second inputs being greater than a third threshold.

12. The computer-assisted device of claim 1, wherein the commanded motion is determined based on a function of an angular difference between a first direction of the first input and a second direction of the second input.

13. The computer-assisted device of claim 1, wherein the repositionable structure is configured to move the display unit within a plane, and wherein a first direction of the first input and a second direction of the second input are in the plane.

14. A method comprising:
  receiving a first input from a first hand-input sensor configured to receive inputs from an operator;
  receiving a second input from a second hand-input sensor configured to receive inputs from the operator;
  in response to either a first magnitude of the first input being less than or equal to a first threshold or a second magnitude of the second input being less than or equal to the first threshold, preventing an actuator from moving a repositional structure based on the first input or the second input; and
  in response to satisfaction of a criteria set, the criteria set comprising that the first magnitude of the first input is greater than the first threshold and the second magnitude of the second input is greater than the first threshold:
    determining a commanded motion based on the first input and the second input, and
    commanding the actuator to move the repositionable structure based on the commanded motion, the repositionable structure configured to support a display unit, the display unit configured to display images viewable by the operator.

15. The method of claim 14, wherein the criteria set further comprises that a difference between a first direction of the first input and a second direction of the second input is less than a second threshold.

16. The method of claim 14, wherein determining the commanded motion based on the first input and the second input comprises:
  discarding a component of the first input or the second input, wherein the component is in a direction that the display unit cannot move.

17. The method of claim 14, wherein determining the commanded motion based on the first input and second the input comprises:
  determining a velocity proportional to a combination of the first input and the second input.

18. The method of claim 14, wherein the first magnitude is larger than the second magnitude, and wherein determining the commanded motion comprises:
  determining a commanded magnitude of the commanded motion based on a combination of the second input and a scaled first input, the scaled first input being a scaling of the first input based on at least one of the first magnitude or the second magnitude.

19. The method of claim 14, wherein the commanded motion is determined based on a function of an angular difference between a first direction of the first input and a second direction of the second input.

20. One or more non-transitory machine-readable media comprising a plurality of machine-readable instructions which when executed by one or more processors are adapted to cause the one or more processors to perform a method comprising:

receiving a first input from a first hand-input sensor configured to receive inputs from an operator;

receiving a second input from a second hand-input sensor configured to receive inputs from the operator;

in response to either a first magnitude of the first input being less than or equal to a first threshold or a second magnitude of the second input being less than or equal to the first threshold, preventing an actuator from moving a repositional structure based on the first input or the second input; and in response to satisfaction of a criteria set, the criteria set comprising that the first magnitude of the first input is greater than the first threshold and the second magnitude of the second input is greater than the first threshold:

determining a commanded motion based on the first input and the second input, and commanding the actuator to move the repositionable structure based on the commanded motion, the repositionable structure configured to support a display unit, the display unit configured to display images viewable by the operator.

* * * * *